United States Patent
Hayashi

(10) Patent No.: US 6,588,014 B1
(45) Date of Patent: Jul. 1, 2003

(54) SYSTEM AND METHOD FOR DIGITAL COMMUNICATION

(75) Inventor: Tsutomu Hayashi, Gifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/159,631

(22) Filed: Sep. 24, 1998

(30) Foreign Application Priority Data

Sep. 26, 1997 (JP) ............................................ 9-261671
Apr. 21, 1998 (JP) .......................................... 10-110336

(51) Int. Cl.[7] .......................... H04N 5/445; H04N 7/20; H04J 3/02
(52) U.S. Cl. .............................. 725/54; 725/63; 725/67; 725/72; 370/537; 370/538
(58) Field of Search ......................... 725/54, 67, 63–72; 370/537, 538

(56) References Cited

U.S. PATENT DOCUMENTS

| | | | |
|---|---|---|---|
| 5,519,780 A | * 5/1996 | Woo et al. ..................... 380/49 |
| 5,600,378 A | * 2/1997 | Wasilewski ................. 348/468 |
| 5,600,573 A | 2/1997 | Hendricks et al. ...... 364/514 R |
| 5,659,350 A | 8/1997 | Hendricks et al. ............. 348/6 |
| 5,844,620 A | * 12/1998 | Coleman et al. ............ 348/461 |
| 6,111,612 A | * 8/2000 | Ozkan et al. ................ 348/465 |
| 6,147,714 A | * 11/2000 | Terasawa et al. ........... 348/564 |
| 6,191,782 B1 | * 2/2001 | Mori et al. .................. 345/327 |
| 6,219,358 B1 | * 4/2001 | Pinder et al. ................ 370/537 |
| 6,389,593 B1 | * 5/2002 | Yamagishi ..................... 725/9 |

FOREIGN PATENT DOCUMENTS

| | | | |
|---|---|---|---|
| EP | 0 705 036 | 4/1996 | ............ H04N/7/08 |
| WO | WO 98 30023 | 7/1998 | ............ H04N/5/44 |

OTHER PUBLICATIONS

Dong–Hee Han et al.: "A SI/PSI, RSMS data stream and PCR/PTS processing algorithm for Koreasat digital DBS system" IEEE Transactions on Consumer Electronics, May 1988, IEEE, USA, vol. 44, No. 2, pp. 398–404, xp002150803 issn:0098–3063 *p. 400, left–hand column, last paragraph—p. 401, left–hand column, paragraph 2*.

* cited by examiner

*Primary Examiner*—Andrew Faile
*Assistant Examiner*—Son P. Huynh
(74) *Attorney, Agent, or Firm*—Michael D. Bednarek; Shaw Pittman LLP

(57) ABSTRACT

A digital broadcasting system capable of quickly acquiring long term program information. An SI generating part SG2 generates a long term program information S_EIT which is multiplexed in a transport stream TS2 only. The SI generating part SG2 gives information on whether the long term program information S_EIT is present or not for each service to other SI generating parts SG1 and SG3. The SI generating parts SG1 and SG3 multiplex the given presence information in transport streams TS1 and TS3. In this way, the presence information is multiplexed in all the transport streams. Therefore, the presence information may be acquired whichever transport stream is being received. If the presence information is retained beforehand, the information may be quickly used as required.

21 Claims, 25 Drawing Sheets

DETAILE BLOCK OF TRANSMITTER

FIG.4

| | | | | | |
|---|---|---|---|---|---|
| TS1 | NIT | SDT1 | P_EIT11 | | ES(A)11 |
| | PAT1 | SDT2 | P_EIT12 | | ES(A)12 |
| | PMT11 | SDT3 | P_EIT13 | | ES(A)13 |
| | PMT12 | | P_EIT14 | | ES(A)14 |
| | PMT13 | | F_EIT11 | | ES(V)11 |
| | PMT14 | | F_EIT12 | | ES(V)12 |
| | | | F_EIT13 | | ES(V)13 |
| | | | F_EIT14 | | ES(V)14 |
| TS2 | NIT | SDT1 | P_EIT21 | S_EIT11 | ES(A)21 |
| | PAT2 | SDT2 | P_EIT22 | S_EIT12 | ES(A)22 |
| | PMT21 | SDT3 | P_EIT23 | S_EIT14 | ES(A)23 |
| | PMT22 | | P_EIT24 | S_EIT21 | ES(A)24 |
| | PMT23 | | F_EIT21 | S_EIT23 | ES(V)21 |
| | PMT24 | | F_EIT22 | S_EIT24 | ES(V)22 |
| | | | F_EIT23 | S_EIT31 | ES(V)23 |
| | | | F_EIT24 | S_EIT34 | ES(V)24 |
| TS3 | NIT | SDT1 | P_EIT31 | | ES(A)31 |
| | PAT3 | SDT2 | P_EIT32 | | ES(A)32 |
| | PMT31 | SDT3 | P_EIT33 | | ES(A)33 |
| | PMT32 | | P_EIT34 | | ES(A)34 |
| | PMT33 | | F_EIT31 | | ES(V)31 |
| | PMT34 | | F_EIT32 | | ES(V)32 |
| | | | F_EIT33 | | ES(V)33 |
| | | | F_EIT34 | | ES(V)34 |

FIG.8 HARDWARE CONSTITUTION OF RECEIVER

BUFFER OF MEMORY 844

FLOW CHART OF FUNDAMENTAL PROCESS FOR RECEIVING

FIG.12

SERVICE INFORMATION CONTROL TABLE

| SERVICE ID | TRANSPORT STREAM ID | PRESENCE INFORMATION |
|---|---|---|
| (SV11) 0×0011 | (TS1) 0×0001 | |
| (SV12) 0×0012 | (TS1) 0×0001 | |
| (SV13) 0×0013 | (TS1) 0×0001 | |
| (SV14) 0×0014 | (TS1) 0×0001 | |
| (SV21) 0×0021 | (TS2) 0×0002 | |
| (SV22) 0×0022 | (TS2) 0×0002 | |
| (SV23) 0×0023 | (TS2) 0×0002 | |
| (SV24) 0×0024 | (TS2) 0×0002 | |
| (SV31) 0×0031 | (TS3) 0×0003 | |
| (SV32) 0×0032 | (TS3) 0×0003 | |
| (SV33) 0×0033 | (TS3) 0×0003 | |
| (SV34) 0×0034 | (TS3) 0×0003 | |

FIG.13

SERVICE INFORMATION CONTROL TABLE

| SERVICE ID | TRANSPORT STREAM ID | PRESENCE INFORMATION |
|---|---|---|
| (SV11) 0×0011 | (TS1) 0×0001 | PRESENT |
| (SV12) 0×0012 | (TS1) 0×0001 | PRESENT |
| (SV13) 0×0013 | (TS1) 0×0001 | ABSENT |
| (SV14) 0×0014 | (TS1) 0×0001 | PRESENT |
| (SV21) 0×0021 | (TS2) 0×0002 | PRESENT |
| (SV22) 0×0022 | (TS2) 0×0002 | ABSENT |
| (SV23) 0×0023 | (TS2) 0×0002 | PRESENT |
| (SV24) 0×0024 | (TS2) 0×0002 | PRESENT |
| (SV31) 0×0031 | (TS3) 0×0003 | PRESENT |
| (SV32) 0×0032 | (TS3) 0×0003 | ABSENT |
| (SV33) 0×0033 | (TS3) 0×0003 | ABSENT |
| (SV34) 0×0034 | (TS3) 0×0003 | PRESENT |

FIG.14

SDT MULTIPLEXED IN THE TRANSPORT STREAM TS1

SDT1

| TABLE ID | TRANSPORT STREAM ID | SERVICE ID | EIT SCHEDULE FLAG | DESCRIPTER() |
|---|---|---|---|---|
| 0×42 | 0×0001 | 0×0011 | 0 | 1 |
|  |  | 0×0012 | 0 | 1 |
|  |  | 0×0013 | 0 | 0 |
|  |  | 0×0014 | 0 | 1 |

SDT2

| TABLE ID | TRANSPORT STREAM ID | SERVICE ID | EIT SCHEDULE FLAG | DESCRIPTER() |
|---|---|---|---|---|
| 0×46 | 0×0002 | 0×0021 | 0 | 1 |
|  |  | 0×0022 | 0 | 0 |
|  |  | 0×0023 | 0 | 1 |
|  |  | 0×0024 | 0 | 1 |

SDT3

| TABLE ID | TRANSPORT STREAM ID | SERVICE ID | EIT SCHEDULE FLAG | DESCRIPTER() |
|---|---|---|---|---|
| 0×46 | 0×0003 | 0×0031 | 0 | 1 |
|  |  | 0×0032 | 0 | 0 |
|  |  | 0×0033 | 0 | 0 |
|  |  | 0×0034 | 0 | 1 |

FIG.15

SDT MULTIPLEXED IN THE TRANSPORT STREAM TS2

SDT1

| TABLE ID | TRANSPORT STREAM ID | SERVICE ID | EIT SCHEDULE FLAG | DESCRIPTER() |
|---|---|---|---|---|
| 0×46 | 0×0001 | 0×0011 | 1 | 1 |
| | | 0×0012 | 1 | 1 |
| | | 0×0013 | 0 | 0 |
| | | 0×0014 | 1 | 1 |

SDT2

| TABLE ID | TRANSPORT STREAM ID | SERVICE ID | EIT SCHEDULE FLAG | DESCRIPTER() |
|---|---|---|---|---|
| 0×42 | 0×0002 | 0×0021 | 1 | 1 |
| | | 0×0022 | 0 | 0 |
| | | 0×0023 | 1 | 1 |
| | | 0×0024 | 1 | 1 |

SDT3

| TABLE ID | TRANSPORT STREAM ID | SERVICE ID | EIT SCHEDULE FLAG | DESCRIPTER() |
|---|---|---|---|---|
| 0×46 | 0×0003 | 0×0031 | 1 | 1 |
| | | 0×0032 | 0 | 0 |
| | | 0×0033 | 0 | 0 |
| | | 0×0034 | 1 | 1 |

FIG.16

SDT MULTIPLEXED IN THE TRANSPORT STREAM TS3

SDT1

| TABLE ID | TRANSPORT STREAM ID | SERVICE ID | EIT SCHEDULE FLAG | DESCRIPTER() |
|---|---|---|---|---|
| 0×46 | 0×0001 | 0×0011 | 0 | 1 |
| | | 0×0012 | 0 | 1 |
| | | 0×0013 | 0 | 0 |
| | | 0×0014 | 0 | 1 |

SDT2

| TABLE ID | TRANSPORT STREAM ID | SERVICE ID | EIT SCHEDULE FLAG | DESCRIPTER() |
|---|---|---|---|---|
| 0×46 | 0×0002 | 0×0021 | 0 | 1 |
| | | 0×0022 | 0 | 0 |
| | | 0×0023 | 0 | 1 |
| | | 0×0024 | 0 | 1 |

SDT3

| TABLE ID | TRANSPORT STREAM ID | SERVICE ID | EIT SCHEDULE FLAG | DESCRIPTER() |
|---|---|---|---|---|
| 0×42 | 0×0003 | 0×0031 | 0 | 1 |
| | | 0×0032 | 0 | 0 |
| | | 0×0033 | 0 | 0 |
| | | 0×0034 | 0 | 1 |

FIG.21

PROGRAM INFORMATION TABLE

| SERVICE ID | EVENT ID | BROADCASTING DATE | BROADCASTING TIME | PROGRAM TITLE | GENRE |
|---|---|---|---|---|---|
| 0×0011 | 0×0001 | 3 | 9:00~10:00 | PROGRAM A | ANIMATION |
| 0×0011 | 0×0002 | 3 | 10:00~12:00 | PROGRAM B | FOREIGN FILM |
| -- | -- | -- | -- | -- | -- |
| 0×0011 | 0×0125 | 10 | 20:00~24:00 | PROGRAM F | SPORTS |
| 0×0012 | 0×0001 | 3 | 9:00~11:00 | PROGRAM Z | FOREIGN MUSIC |
| -- | -- | -- | -- | -- | -- |

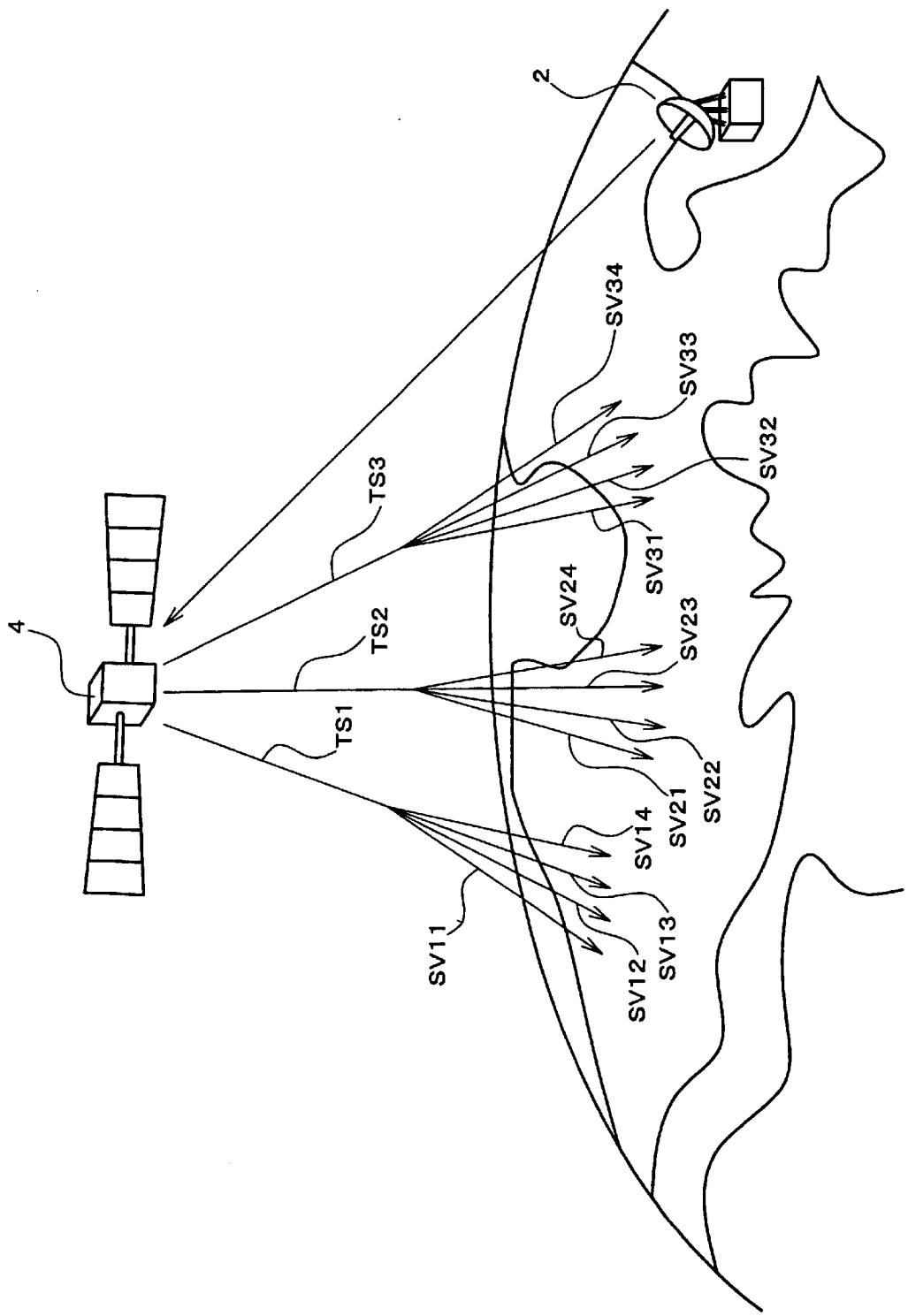
FIG.22 <PRIOR ART>

FIG.23 <PRIOR ART>

| | | | | | |
|---|---|---|---|---|---|
| TS1 | NIT | SDT1 | P_EIT11 | | ES(A)11 |
| | PAT1 | SDT2 | P_EIT12 | | ES(A)12 |
| | PMT11 | SDT3 | P_EIT13 | | ES(A)13 |
| | PMT12 | | P_EIT14 | | ES(A)14 |
| | PMT13 | | F_EIT11 | | ES(V)11 |
| | PMT14 | | F_EIT12 | | ES(V)12 |
| | | | F_EIT13 | | ES(V)13 |
| | | | F_EIT14 | | ES(V)14 |
| TS2 | NIT | SDT1 | P_EIT21 | S_EIT11 | ES(A)21 |
| | PAT2 | SDT2 | P_EIT22 | S_EIT12 | ES(A)22 |
| | PMT21 | SDT3 | P_EIT23 | S_EIT14 | ES(A)23 |
| | PMT22 | | P_EIT24 | S_EIT21 | ES(A)24 |
| | PMT23 | | F_EIT21 | S_EIT23 | ES(V)21 |
| | PMT24 | | F_EIT22 | S_EIT24 | ES(V)22 |
| | | | F_EIT23 | S_EIT31 | ES(V)23 |
| | | | F_EIT24 | S_EIT34 | ES(V)24 |
| TS3 | NIT | SDT1 | P_EIT31 | | ES(A)31 |
| | PAT3 | SDT2 | P_EIT32 | | ES(A)32 |
| | PMT31 | SDT3 | P_EIT33 | | ES(A)33 |
| | PMT32 | | P_EIT34 | | ES(A)34 |
| | PMT33 | | F_EIT31 | | ES(V)31 |
| | PMT34 | | F_EIT32 | | ES(V)32 |
| | | | F_EIT33 | | ES(V)33 |
| | | | F_EIT34 | | ES(V)34 |

<PRIOR ART>

DATA PACKETING

<PRIOR ART>

SYSTEM AND METHOD FOR DIGITAL COMMUNICATION

FIELD OF THE INVENTION

This invention relates to digital communication such as satellite broadcasting and, more particularly, to increasing the information acquiring process speed for long term programs.

BACKGROUND

FIG. 22 schematically illustrates a state of sending satellite broadcasting radio waves as a simplified conceptual chart. Radio waves from a ground station 2 are set through a broadcasting satellite 4 to the ground. From the broadcasting satellite 4 are sent out a plural number of transport streams (transmission routes determined by frequency, plane of polarization, etc.) TS1, TS2, and TS3. Furthermore a plural number of services SV11, SV12, SV13, and SV14 (corresponding to channels in the ground wave broadcasting) are multiplexed by time division in packets in the transport stream TS1. Similarly, services SV21, SV22, SV23, and SV24 are multiplexed in the transport stream TS2, and services SV31, SV32, SV33, and SV34 are multiplexed in the transport stream TS3. To the transport streams are also sent out program information and control data associated with the packeting or the like in addition to video data and audio data for respective services. While FIG. 22 shows only three transport streams, much more transport streams are actually sent out. Furthermore, while FIG. 22 shows four services multiplexed for each transport stream, in actuality much more services are multiplexed.

FIG. 23 shows video data, audio data, control data, and program information multiplexed in the transport streams TS1, TS2, and TS3. In the transport stream TS1 are multiplexed: audio data ES(A)11 and video data ES(V)11 of the service SV11; audio data ES(A)12 and video data ES(V)12 of the service SV12; . . . , and audio data ES(A)14 and video data ES(V)141 of the service SV14. For each of the services SV11, SV12, SV13, and SV14 are also multiplexed currently broadcast program information P_EIT11, P_EIT12, P_EIT13, and P_EIT14, and information F_EIT11, F_EIT12, F_EIT13, and F_EIT14 of programs to be broadcast next. Furthermore, an SDT1 describing the details of the service multiplexed in the transport stream TS1, an SDT2 describing the details of the service multiplexed in the transport stream TS2, and an SDT3 describing the details of the service multiplexed in the transport stream TS3 are also multiplexed and transmitted.

Incidentally, audio data, video data, and program data are multiplexed also in other transport streams TS2 and TS3. However, for the long-term program information S_EIT11, S_EIT12, . . . , S_EIT14, S_EIT21, S_EIT22, . . . , S_EIT24, S_EIT31, S_EIT32, . . . , S_EIT34, and S_EIT41, S_EIT42, . . . , S_EIT44, the information is multiplexed only in the transport stream TS2 because the amount of information is large.

In some services, the long term program information is not provided for reasons such as that always the same contents are broadcast. Therefore, in the control data SDT1, SDT2, and SDT3 of the transport stream TS2, there is described the information on whether the long term program information S_EIT is present or not for the services SV11 to SV14, SV21 to SV24, and SV31 to SV34. However, the presence information is described only for the control data SDT1, SDT2, and SDT3 of the transport stream TS2 in which the long-term program information S_EIT is multiplexed. In the control data SDT1, SDT2, and SDT3 of other transport streams TS1 and TS3, areas for describing the presence information is provided, but their contents are all described as "nil" and no substantial presence information is described.

Each piece of the above-described information is transmitted in packets as shown with 60a in FIG. 24. That is to say, video data and audio data of each service are multiplexed in packets and transmitted. After the transmission with 60a, transmission with 60b follows. Incidentally, a packet ID is attached to ES in packet of each service, The packet ID of ES of each service is arranged to be recognized with control data PAT and PMT, With such an arrangement, the ES for each service may be acquired selectively. While FIG. 24 is shown for the transport stream TS1, the same applies to other transport streams TS2 and TS3.

Furthermore, control data NIT is multiplexed in each of the transport streams TS1, TS2, and TS3. In the control data NIT are described transmission specifications (frequencies, etc.) of the transport streams TS1, TS2, and TS3, and service names (service IDs) included in those transport streams. This makes is possible to learn what kinds of services are included in each of the transport streams. In the control data NIT is also described the information showing in which transport stream the long term program information is written.

FIG. 25 roughly shows a satellite broadcasting receiver. A transport stream is selected with a tuner 8, and a described service is separated with a decoder 10. From the decoder 10 are output selected audio data and video data. A microprocessor (MPU) 12 sets a packet ID of the ES of a desired service to the decoder 10. This causes the decoder 10 to output the ES of the service. When the packet ID of the control data is set to the decoder 10, separated control data is given to the MPU 12.

Assuming that the service SV33 of the transport stream TS3 is currently being received, operation of a case will be described below in which a command is given to the MPU 12 to switch to the service SV12 of the transport stream TS1. First, the MPU 12 takes in control data NIT (See FIG. 23) by controlling the decoder 10 (namely by setting the packet ID of the control data NIT). It is learned from the description of the control data that the service SV12 to be received is multiplexed in the transport stream TS1. Next, the transport stream TS1 is received by controlling the tuner 8. Further, the decoder 10 is controlled to acquire the control data PAT1 and PMT12, and to acquire packet IDs of the video data ES(A) 12 and audio data ES(V)12. Next, this packet ID is set to the decoder 10 so that the video data (ES(A) 12 and audio data ES(V)12 of the intended service SV12 are output from the decoder 10. Switching to the service to be received is carried out as described above.

Incidentally, a future broadcasting schedule of any of the services may be learned by acquiring the long term program information of S_EIT of the service in question. The long term program information S_EIT includes genre information on each event (so-called program) broadcast in each service. Therefore, once the long term program information S_EIT is acquired, it is possible to search and display broadcasting schedules in specific genres.

Assuming that the service SV12 is currently being received, the process of acquiring the long term program information S_EIT will be described below. First, the MPU 12 controls the decoder 10 to separate and acquire the control data NIT. From the description of the control data NIT, a transport stream is known where the long term program information S_EIT is multiplexed, and the tuner 8 is controlled to receive the transport stream TS2. Further, the decoder 10 is controlled to separate and acquire the control data SDT1, SDT2, and SDT3, and to acquire the presence information for the long term broadcasting program in each service.

According to the presence information, the MPU 12 controls the decoder 10 for only the service in which the long term program information is present, and acquires the long term program information.

As described above, the long term program information may be acquired for each service. The acquired long term program information may be displayed as it is, or searched according to the genre information to display program information only in a specific genre.

However, with the conventional art described above, the following processes are required to acquire the long term program information: (1) to switch to receive the transport stream in which the presence information for the long term program information is multiplexed, (2) to acquire the presence information in the switched transport stream, and (3) to acquire the long term program information in the required service according to the presence information. Therefore, there is a problem that a long time is taken before the long term program information appears on the display screen when the receiver is operated by a receiving person intending to display the information.

SUMMARY OF THE INVENTION

The object of the invention is to provide a digital communication capable of solving the above-described problem and quickly acquiring the long term program information. Means for Solving the Problem and the Effect of the Invention This invention is characterized in that, on a sending side, at least one transport stream is assumed as a specified transport stream, long term program information for each service is multiplexed in the specified transport stream, and, for each service, presence information on whether the long term program information is multiplexed in the specified transport stream is multiplexed in all the transport streams including at least one service, and on a receiving side, the presence information for each service multiplexed in the transport stream currently being received is acquired and retained beforehand, and if it is necessary to learn the presence or absence of the long term program information for the service, whether the long term program information for the service is present is determined from the retained presence information.

Since the presence information for the long term program information is multiplexed also in the transport streams other than the specified transport stream, the presence information may be acquired even when a transport stream other than the specified transport stream is being received. In particular, if the multiplexing is made in all the transport streams, the presence information may be acquired and retained beforehand irrespective of whichever transport stream being current received. Therefore, in the case the long term program information is required, the information may be quickly acquired by switching the transport stream and then immediately acquiring the information according to the retained presence information.

Furthermore, by multiplexing the presence information also in all the transport streams that do not include service, the presence information may be acquired even when such transport streams are being received.

In this invention, the presence information is described on a service description table (SDT). In any transport stream, the service description table has an area for describing all the services of all the transport streams (description loops for respective transport streams). Therefore, the presence information for each service may be easily described.

In this invention, the presence information is described on a network information table (NIT). In any transport stream, the network information table has an area for describing all the services of all the transport streams. Therefore, the presence information for each service may be easily described.

In this invention, the receiver is adapted to acquire and retain the presence information for all the services at specified time intervals during the receiving operation. Therefore, the presence information is renewed to the latest at the specified time intervals.

In this invention, the receiver is adapted to acquire and retain the presence information for all the services when the power supply is off. Since the receiving person does not make the receiving operation while the power supply is off, acquisition of the presence information can take time.

In this invention, the acquired long term program information is searched on the receiving side. Therefore, the long term program information in restricted genres may be quickly displayed.

In this invention, "long term program information multiplexing means" refers to the means for multiplexing long term program information in the transport streams. In the embodiment, it refers to the generating part SG2 and the multiplexing part MX2 in FIG. 1.

The "long term program information" refers to the information including at least the information on the program to be broadcast after the program to be broadcast next to the current program. In the embodiment, the program in question refers to S_EIT in FIG. 20. Here, the "program" refers to the index information of the contents sent by broadcasting. The concept of program referred to here also includes predetermined broadcasting plan for broadcasting computer programs and data.

The "presence information" multiplexing means refers to the means for multiplexing the presence information in the transport stream. In the embodiment, it refers to the SI generating part SG1, and the SC3 multiplexing parts MX1 and MX3 in FIG. 1.

The "presence information" is the information that indicates whether the long term program information for the service is multiplexed in the specified transport stream. In the embodiment, it refers to the descriptors () in FIGS. 14, 15 and 16. It also refers to the EIT schedule Flag in FIG. 15.

The "specified transport stream" refers to the transport stream in which the long term program information is multiplexed. In the embodiment, it refers to the transport stream TS2. While there is only one specified transport stream in the embodiment, there may be a plural number of specified transport streams.

The "presence information retaining means" refers to the means for acquiring and retaining the presence information. In the embodiment, it refers to the CPU 847 in FIG. 8 (especially steps S34, S35, and S36) and the service information management memory 842.

The "long term program information acquisition means" refers to the means that determines the presence or absence of the long term program information, and acquires the long term program information for only the services where the long term program information is present. In the embodiment, it refers to the CPU 847 in FIG. 8(in particular the steps S47 and S48).

The "receiver" refers to the device that is capable of selectively receiving required transport stream and service from a plural number of transport streams. This concept includes the receivers or the like including the so-called set-top box and the CRT.

The "recording medium with recorded programs" refers to the recording medium such as the ROM, RAM, hard disk, flexible disk, CD-ROM or the like on which programs that can be executed with a CPU are recorded. Here, the program also includes not only those which can be executed directly with a CPU but also those which must be once installed, is compressed or coded.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIG. 4 shows video and audio data, and control data multiplexed in each transport stream;

FIG. 12 shows a service information control table;

FIG. 13 shows a service information control table;

FIG. 14 shows the described contents of SDT multiplexed in the transport stream TS1;

FIG. 15 shows the described contents of SDT multiplexed in the transport stream TS2;

FIG. 16 shows the described contents of SDT multiplexed in the transport stream TS3;

FIG. 21 shows a program information table;

FIG. 22 is a simplified conceptual chart of satellite broadcasting;

FIG. 23 shows the data multiplexed in each transport stream;

DETAILED DESCRIPTION OF THE PREFERRED EMBODIMENTS

1. Constitution of the Whole System:

(1) Transmitter

Figure 1:
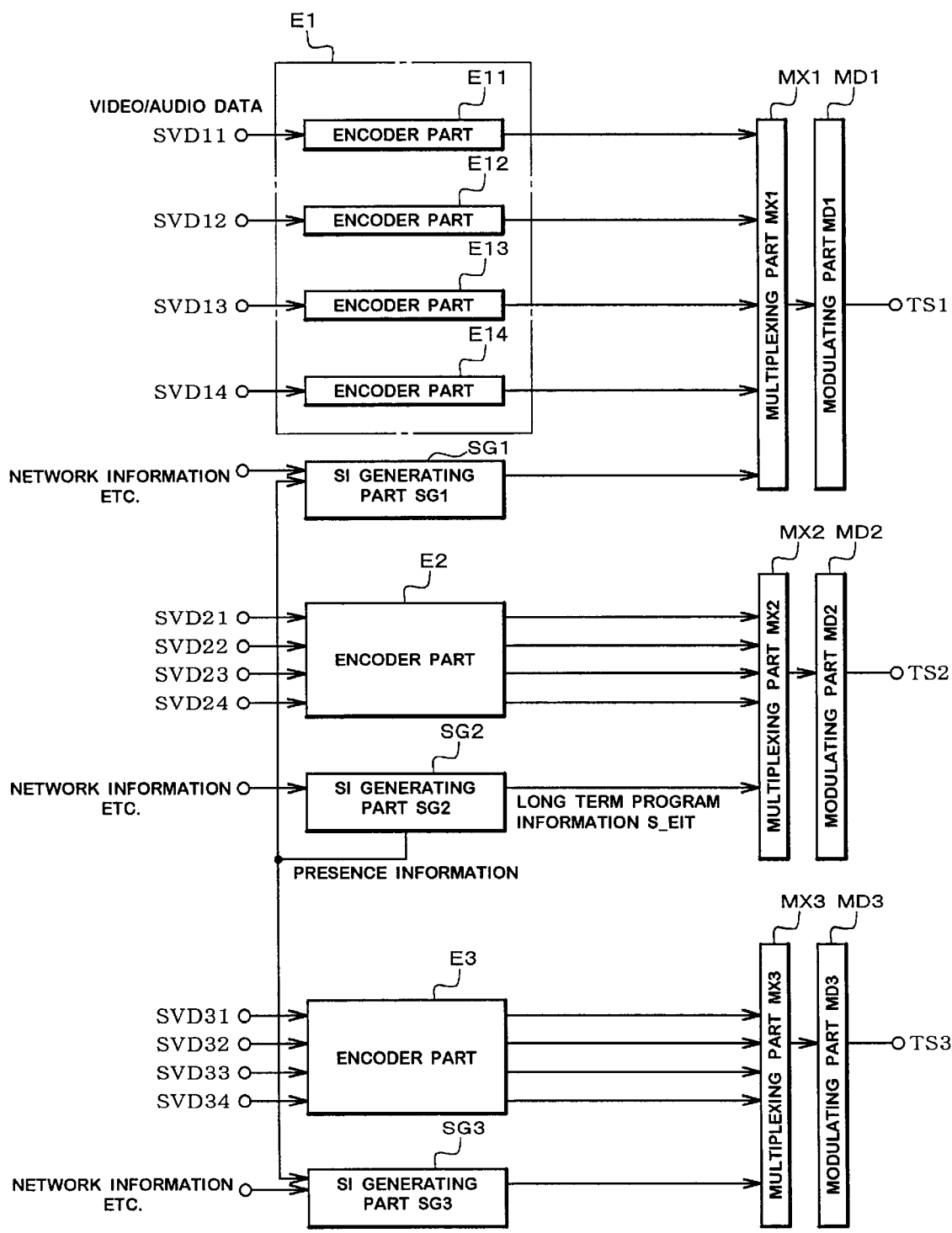
FIG. 1 is a block diagram of a transmitter according to an embodiment of this invention.

FIG. 1 is a block diagram of a transmitter for use in a digital broadcasting system according to an embodiment of this invention. In the figure, video/audio data SVD11 are the contents of a service SV11. Similarly, video/audio data SVD12, SVD13, SVD14, SVD21, SVD22, SVD23, SVD24, SVD31, SVD32, SVD33, and SVD34 are respectively contents of services SV12, SV13, SV14, SV21, SV22, SV23, SV24, SV31, SV32, SV33, and SV34. Incidentally, depending on the service, there may be cases in which either only the audio data or only the video data are the contents of the service.

The video/audio data SVD11 are compression-processed in an encoder part E11 by means of an MPEG or the like. Similarly, the video/audio data SVD12, SVD13, and SVD14 are compression-processed in encoder parts E12, E13, and E14. These compressed data are arranged in packets and multiplexed in a multiplexing part MX1 and made as a transport stream TS1. The transport stream TS1 is modulated in a modulating part MD1 and transmitted. In the case of the satellite broadcasting, it is transmitted through an artificial satellite.

Also the video/audio data SVD21, SVD22, SVD23, and SVD24 are similarly compressed in an encoder part E2, multiplexed in a multiplexing part MX2, modulated in a modulating part MD2, and transmitted as a transport stream TS2. Also the video/audio data SVD31, SVD32, SVD33, and SVD34 are similarly transmitted as a transport stream TS3.

An SI generating part SG1 receives information on the network (such as the frequency and plane of polarization of each transport stream, and service name information multiplexed in the transport stream), information on the service multiplexed in each transport stream (such as the presence information for the long term program information, and service name), and the program information (such as the program names to be broadcast in each service), and according to such information, generates control data. The multiplexing part MX1, when it multiplexed the video/audio data, also multiplexes the control data generated in the SI generating part SG1. Similarly, the multiplexing parts MX2 and MX3 multiplex also the control data generated in the SI generating parts SG2 and SG3, respectively.

The SI generating part SG2 generates long term program information S_EIT (Scheduled Event Information Table) according to the program information provided. However, for the services that do not require the long term program information, such information is not generated.

Incidentally, the long term program information $S_{13}EIT$ (Scheduled Event Information Table) is generated only in the SI generating part SG2, and not in the SI generating parts SG1 and SG3. Therefore, the long term program information S_EIT (Scheduled Event Information Table) on each service is multiplexed only in the transport stream TS2. That is to say, in this embodiment, the transport stream TS2 is the specified transport stream.

The SI generating part SG2, when it generates the long term program information S_EIT, generates a presence information on whether the long term program information S_EIT is present for each service. The presence information too is multiplexed as part of the control data in the multiplexing part MX2.

The presence information generated in the SI generating part SG2 is given to the SI generating parts SG1 and SG3.

The SI generating parts SG1 and SG3 multiplexes the presence information as part of the control data in the multiplexing parts MX1 and MX3. In this way, the presence information is multiplexed in all the transport streams.

In the embodiment of FIG. 1, the long term program information multiplexing means is constituted with the SI generating part SG2 and the multiplexing part MX2, and the presence information multiplexing means is constituted with the SI generating parts SG1 and SG3, and the multiplexing parts MX1 and MX3. Incidentally, while four services are multiplexed in one transport stream in FIG. 1, the number of services may be less than or more than four. Furthermore, while three transport streams TS1, TS2, and TS3 are shown, much more (such as several tens to several hundreds of) transport streams are generated.

(2) Receiver

Figure 2:
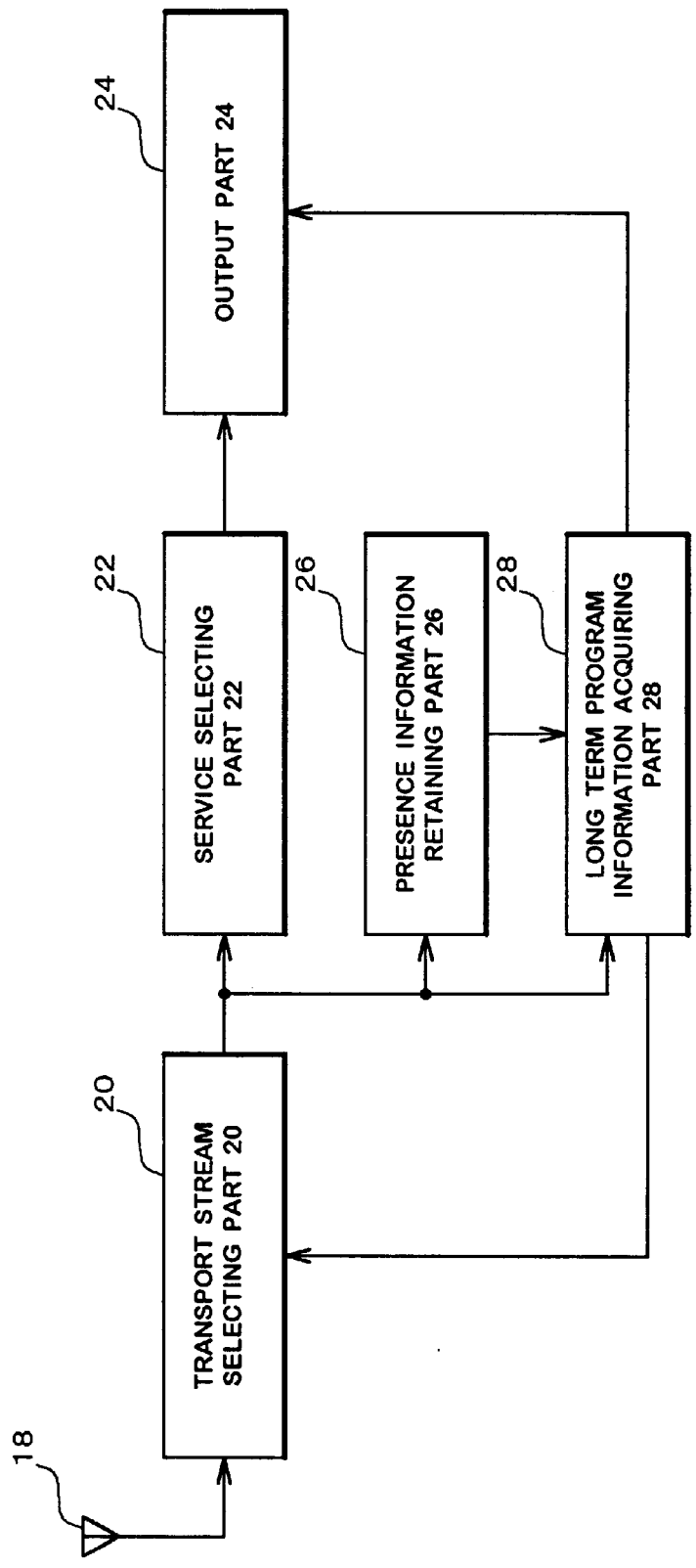
FIG. 2 is a block diagram of a receiver according to an embodiment of this invention.

FIG. 2 shows the block diagram of a receiver in the digital broadcasting system as an embodiment of this invention. Radio wave sent from the transmitter either along the earth as the ground wave or through a broadcasting satellite are caught with an antenna 18. A transport stream selecting part 20 selects a frequency and selectively receives on transport stream. A service selecting part 22 selects one service from a plural number of services multiplexed in the transport steam and gives it to an output part 24. The output part 24 decompresses (extends) the compressed data and outputs the video/audio data of the selected service.

A presence information retaining part 26 separates, acquires, and retains the presence information indicating the presence or absence of the long term program information S_EIT multiplexed in the transport stream. This makes it possible to know whether the long term program information S_EIT is multiplexed in the specified transport steam for every service. As described above, since the presence information is multiplexed in all the transport streams, the presence information may be acquired and retained whichever service is being received.

A long term program information acquiring part 28 determines whether the long term program information is present in each service according to the presence information retained in advance of the presence information retaining part 26. After that, the specified transport stream is received and the process of acquiring the long term program information S_EIT is performed for only the service where the long term program information is present. The acquired long term program information is processed with a search or the like and displayed on the output part 24.

In this embodiment as described above, since the presence information on the long term program information for each service is multiplexed in all the transport streams, the presence information may be retained in advance in the receiver, so that the long term program information may be acquired through a quick process.

In this embodiment, the presence information retaining means is constituted with the presence information retaining part 26, and the long term program information acquiring means is constituted with the long term program information acquiring part 28.

2. Details of the Transmitter

Figure 3:
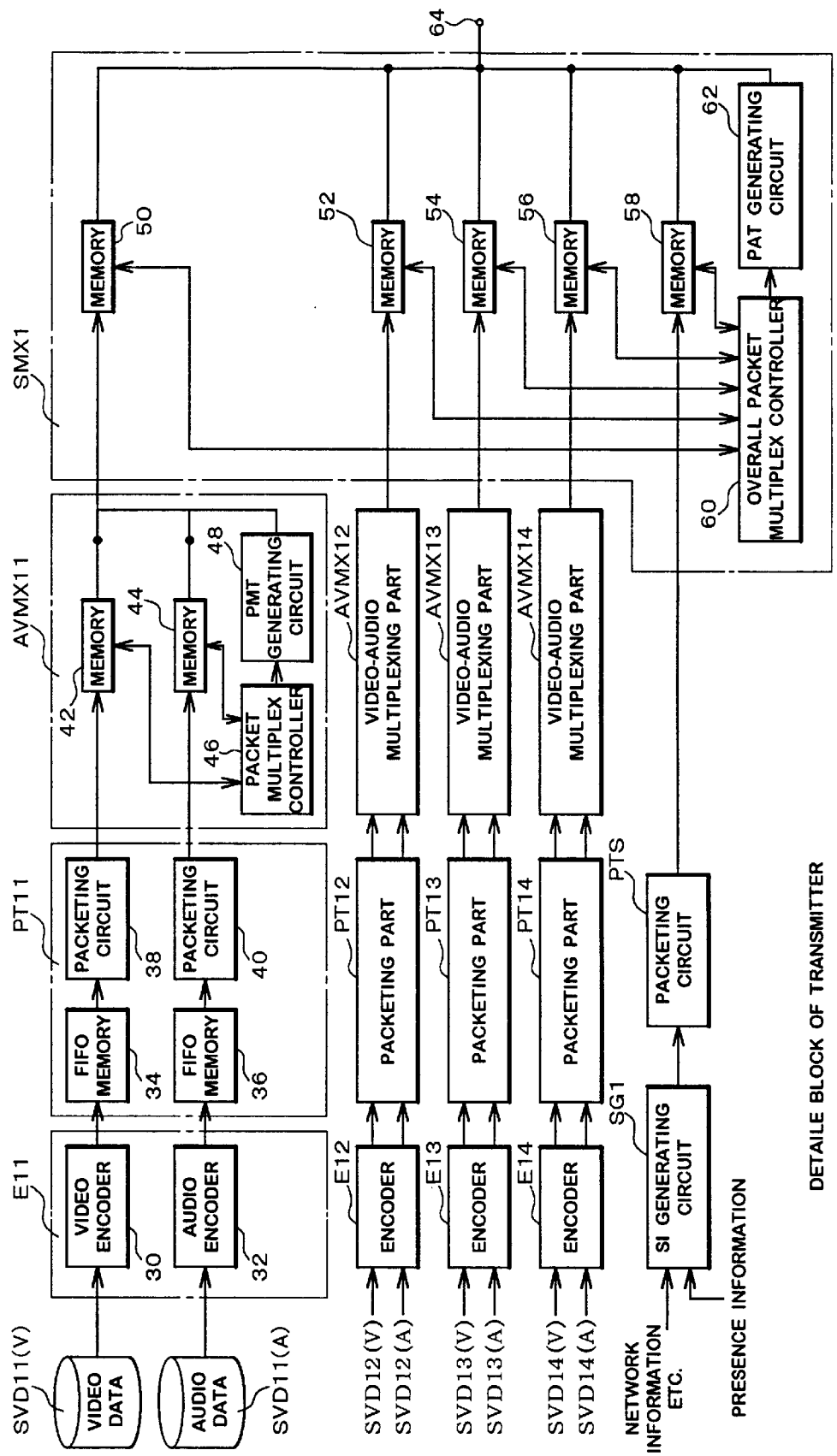
FIG. 3 is a block diagram showing the details of the transmitter.

FIG. 3 shows the details of part of the transmitter shown in FIG. 1 for generating the transport stream TS1. Graphic data SVD11(V) of the service SV11 is compressed in a video encoder 30. The compressed data is given as an ES (elementary stream) to a FIFO (first-in first-out) memory 34 at variable rates. The FIFO memory 34 outputs the ES of the video data to a packeting circuit 38 at a fixed rate.

The packeting circuit 38 divides the ES of the video data into packets of a fixed length (such as 188 bite long) and writes them as PES (packeted ES) into a memory 42. At this time of the writing, a packet identifier (PID) is attached to each PES.

In a similar manner to that with the video data, the audio data SVD11(A) of the service SV11 is compressed in a audio encoder 32 and given to a FIFO memory 36. Furthermore, the data is made into packets of a fixed length in a packeting circuit 40, attached with a PID, and written into a memory 44.

A packet multiplex controller 46 reads the PES of the video data and audio data stored in the memories 42, 44 according to an encoding speed. It also gives the PID attached to the PES of the video data and audio data to a PMT generating circuit 48. The PMT generating circuit 48 receives them and generates a PMT (Program Map Table). The PID attached to the PES of the video data and audio data of the service in question are described in the control data PMT. The packet multiplex controller 46 multiplexes by time-division and writes the PES of the read video data and audio data and their control data PMT to a memory 50.

In this way, the time-division multiplexed data for the service SV11 is generated and stored in the memory 50.

For other services SV12, SV13, and SV14, the video data SVD12(V), audio data SVD12(A), video data SVD13(V), audio data SVD13(A), video data SVD14(V), and audio data SVD14(A) are compressed with the encoders E12, E13, and E14. The compressed ES is arranged in packets as PES with packeting parts PT12, PT13, and PT14, and multiplexed by time division with video-audio multiplexing parts AVMX12, AVMX13, and AVMX14. Time-division multiplexed data for the services SV12, SV13, and SV14 are respectively stored in memories 52, 54, and 56.

Here, the constitution of the encoders E12, E13, and E14 is the same as that of the encoder E11. The constitution of the packeting parts PT12, PT13, and PT14 is the same as that of the packeting part PT11. The constitution of the video-audio multiplexing parts AVMX12, AVMX13, and AVMX14 is the same as that of the video-audio multiplexing part AVMX11.

The SI generation circuit SG1 receives network information, service information, and program information, and generates control data NIT, SDT, P_EIT, and F_EIT. The control data P_EIT (Present EIT) is the information indicating the currently broadcast program and is generated for each service. The control data F_EIT (following EIT) is the information indicating the program to be broadcast next to the currently broadcast program and is generated for each service. The SI generating circuit SG1 generates control data P_EIT11 through P_EIT14, and F_EIT11 through F EIT14 for the services SV11 through SV14 multiplexed in the transport stream TS1.

The control data SDT (Service Description Table) is the information which describes the details of each service multiplexed in each transport stream, and is generated for each transport stream. In other wards, in the SI generating circuit SG1 are generated the control data SDT1 for the transport stream TS1, the control data SDT2 for the transport stream TS2, and the control data SDT3 for the transport stream TS3. In other SI generating circuits SG2 and SG3 (Refer to FIG. 1), the control data SDT1, SDT2, and ST3 are generated.

The control data NIT (Network Information Table) describes the information such as the frequency and the plane of polarization of each transport streams TS1 through TS3, and the information such as the service ID multiplexed in each transport stream. From the control data NIT, which service is multiplexed in which transport stream may be known. In the control NIT is also described which transport stream is the specified stream (in which a long term program information is multiplexed).

These control data NIT, SDT, P_EIT, and F_EIT are arranged in packets in the packeting circuit PTS, affixed with PID, and stored in the memory 58.

An overall packet multiplex controller 60 reads packets of PES and control data stored in the memories 50, 52, 54, 56, and 58. It also gives PID affixed to each packet to a PAT generating circuit 62. The PAT generating circuit 62 receives it and generates control data PAT (Program Association Table). In the control data PAT is described the PID of the control data PMT (Refer to the PMT generating circuit 48) which describes the packet identifier (PID) of the PES of each service. The overall packet multiplex controller 60 time-division multiplexes the PES of each service read and their control data PAT, and outputs from a terminal 64.

In the manner described above, the transport stream TS1 is generated. The transport streams TS2 and TS3 are generated with the same constitution as shown in FIG. 3. However, since the transport stream TS2 is the specified transport stream for multiplexing the long term program information, the SI generating circuit SG2 generates the long term program infraction S_EIT for the necessary service. The description of the control data SDT generated with the SI generating circuit SG2 is partially different from the description of the control data generated with other SI generating circuits SG1 and SG3. The difference will be described later.

FIG. 4 shows the data multiplexed in the transport streams TS1, TS2, and TS3 generated as described above. The symbol ES(A) denotes audio data, and ES(V) denotes video data. The symbols NIT, PAT, PMT, SDT, P_EIT, F_EIT, and S_EIT denote the control data described above. As is clear from the figure, of the above data, the long term program information $S_{13}$ EIT is multiplexed only in the specified transport stream TS2.

Figure 5:
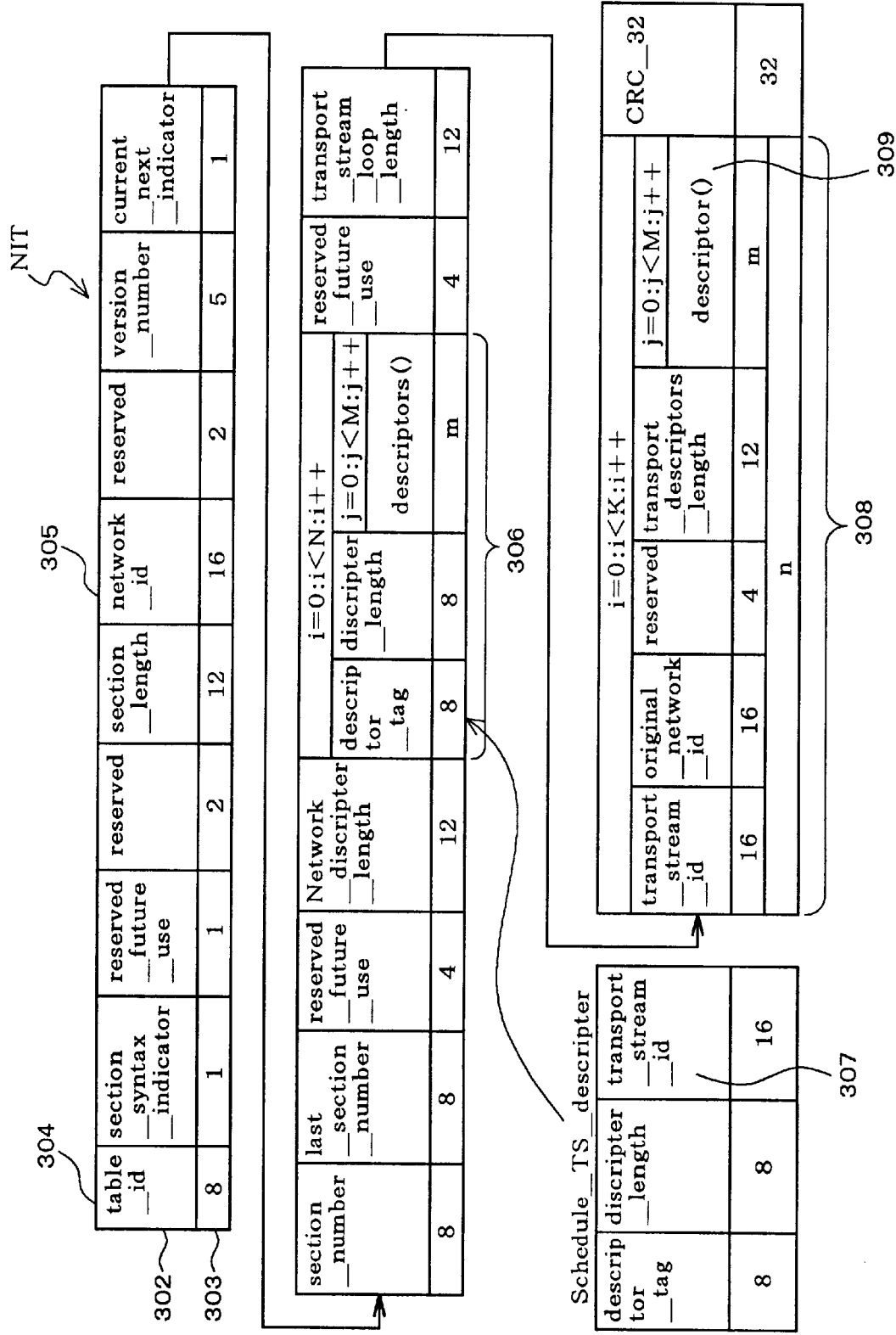
FIG. 5 shows the data structure of the control data NIT.

FIG. 5 shows the data structure of the control data NIT generated with the SI generating circuit. The bit numbers shown in the lower row 303 are allocated to describe the data shown in the upper row 302. In the "table id" 304 is described an identifier to identify that the control data are NIT. The "network id" 305 is the identifier for identifying this network. In the "descriptor tab," "descriptor length," and "descriptor ()" 306 or specifically in the area 307 is described which transport steam is the specified one in which the long term program information S_EIT is multiplexed. In the "Description in each transport stream" 308 are secured description areas repeatedly by the number of transport streams K (three kind here). This is shown with i=0: i <K: i++. In the "Description in each transport stream" 308 or specifically in the service descriptor area (not shown) is described the information on the service ID (identifier, for specifying an effective service) multiplexed in each transport stream.

As shown in FIG. 4, the control data NIT with the same contents are multiplexed and transmitted in each of the transport streams TS1, TS2, and TS3.

Figure 6:
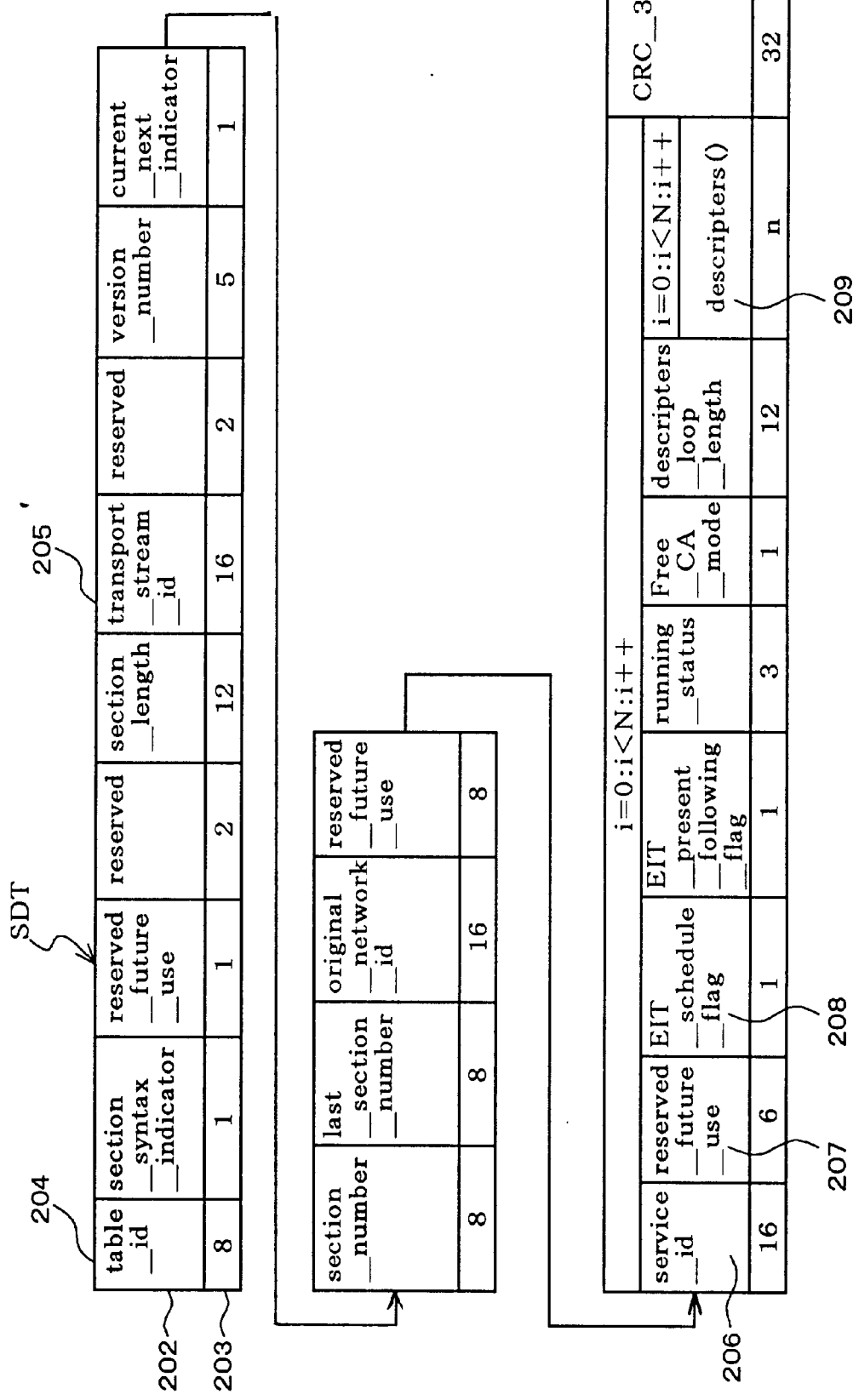
FIG. 6 shows the data structure of the control data SDT.

FIG. 6 shows the structure of the control data SDT generated with the SI generating circuit. The bit numbers shown in the lower row 203 are allocated to describe the data shown in the upper row 202. In the "table id" 204 is described an identifier to identify that the control data are SDT. The control data SDT are generated as SDT1, SDT2, and SDT3 respectively for the transport streams TS1, TS2, and TS3. In each transport stream are multiplexed, in addition to the SDT for its own, SDT for other transport streams (Refer to FIG. 4). In the "table id" 204 is described "0x42" in the case of SDT related to its own transport stream and "0x46" in the case of SDT for other transport streams.

In the "transport stream id" 205 is described the identifier of the transport stream in which the service described in the SDT is multiplexed. The identifier of the transport stream TS1 is described for the control data SDT1, the identifier of the transport stream TS2 is described for the control data SDT2, and identifier of the transport stream TS3 is described for the control data SDT3. Incidentally, the description of the "service id" 206 through "descriptors ()" is repeated by the number of services N (four here). This is shown with i=0: i<K: i ++.

The "service id" 206 is the identifier of service. To the "EIT schedule flag" 208 is described a flag showing the presence or absence (presence information) of the long term program information on each service, if the transport stream in which the SDT is multiplexed is the specified transport stream (TS2 here). That is to say, in the SDT1, SDT2, and SDT3 multiplexed in the transport stream TS2, "1" is described to the "EIT schedule flag " 208 when the long term program information is present (multiplexed), and "0" is described to the "EIT schedule flag" 208 when the long term program information is not present (not multiplexed) for each service.

If the transport stream in which the SDT is multiplexed is not the specified transport stream (TS1 and TS3 here), "0" is described to the "EIT schedule flag" 208 for all the services irrespective of presence or absence of the long term program information. In other words, in the SDT1, SDT2, and SDT3 multiplexed in the transport stream TS1, TS2, "0" is always described to the "EIT schedule flag" 208.

Incidentally, the SI generating circuit SG2 of the specified transport stream TS2 sends out a flag showing the presence of the long term program information for each service to other SI generating circuits SG1 and SG3. The SI generating circuits SG1 and SG3 receives the sent out flag and describes it to the "descriptors( )" 209 of the control data SDT1, SDT2, and SDT3. Therefore, also in the SDT1, SDT2, and SDT3 of the transport streams TS1 and TS3, presence or absence of the long term program information for each service may be learned by seeing the description in the "descriptors( )" 209.

Figure 7:
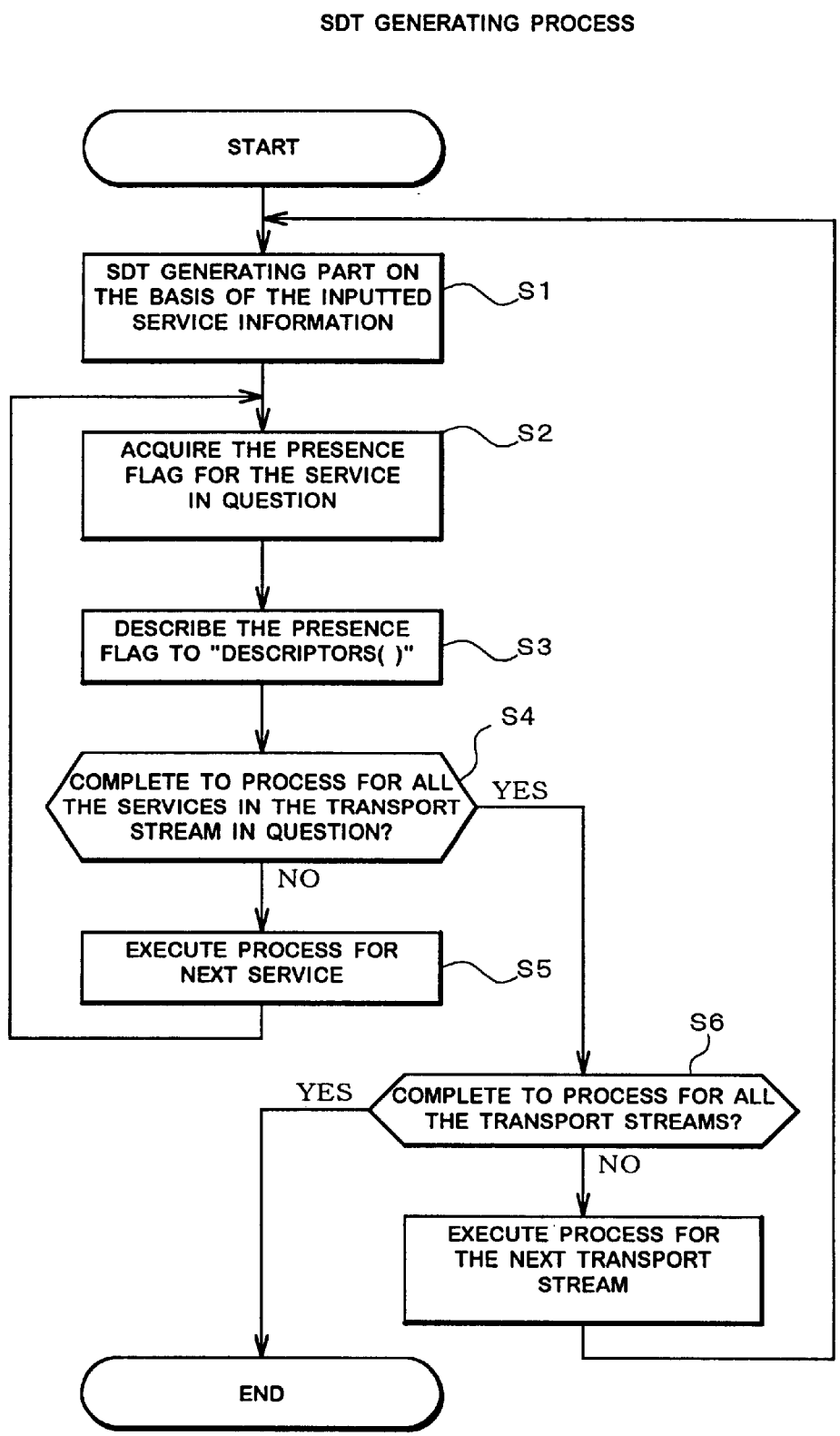
FIG. 7 is a flow chart showing the process of generating the control data SDT.

FIG. 7 is a flow chart of the control data generating process with the SI generating circuit SG. First in the step S1, an SDT section of the transport stream in question is generated on the basis of the inputted service information. Next, information on the presence of the long term program for the service is acquired (step S2). The acquired presence information is described to the "descriptors( ) (step S3)."

Next, it is determined whether the steps S2 and S3 are executed for all the services in the transport stream in question (step S4). If any service remains unprocessed, the next is made the subject (step S5) to repeatedly execute from the step S2 on.

When the process for all the services in the transport stream is over, generation of one SDT for the transport stream in question is complete. Next in the step S6, it is determined whether the SDT is generated for all the transport streams. If any transport stream remains to be processed, the next transport stream is made the subject, and the step S1 and the succeeding steps are repeatedly executed.

In the manner described above, the SDT corresponding to each transport stream is generated.

Incidentally, while this embodiment is arranged to generate the presence information with the SI generating circuit SG2 and give it to other SI generating circuits SG1 and SG3, it may also be arranged to generate the presence information with other circuit or software and give it to the Si generating circuits SG1, SG2, and SG3.

Incidentally, while it is not always necessary to describe the presence information to the "descriptors( )" 209 of the SDT3, it is preferable to describe the presence information to these descriptors.

While the above-described embodiment is arranged to describe the presence information in the "descriptors( )" 209, it may be described in other areas as long as the areas are made to correspond to the service. For instance, it may be described in the "reserved future use" 207. Or, it may be described in the "descriptors( )" 309 of the control data NIT shown in FIG. 5. The area 308 is the area for repeated description for each transport stream (description loop for each transport stream). The "descriptors( )" 309 is the area for further repeated description for each service.

Figure 20:
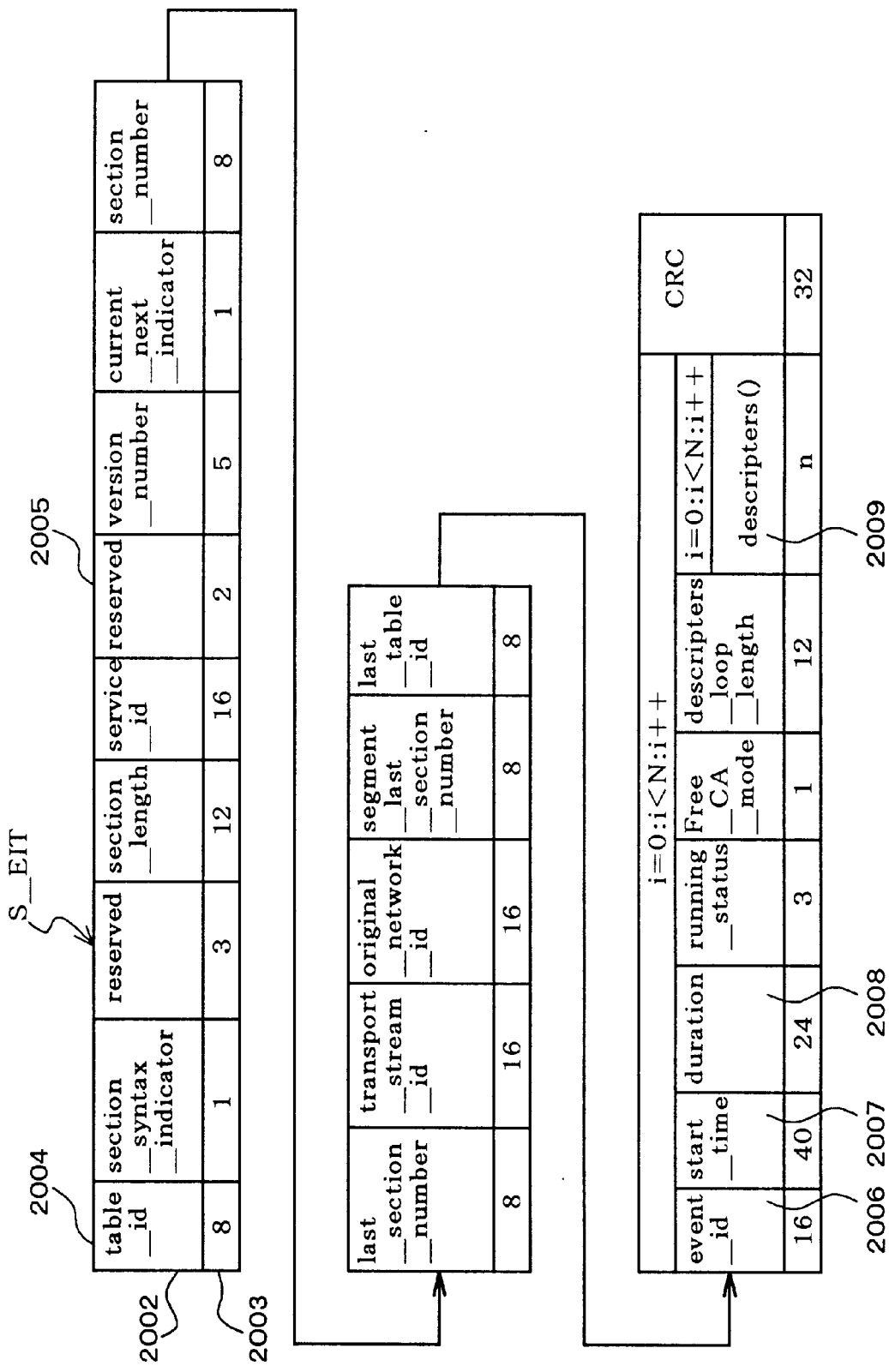
FIG. 20 shows the data structure of a long term program information $S\_{EIT}$.
Figure 24:
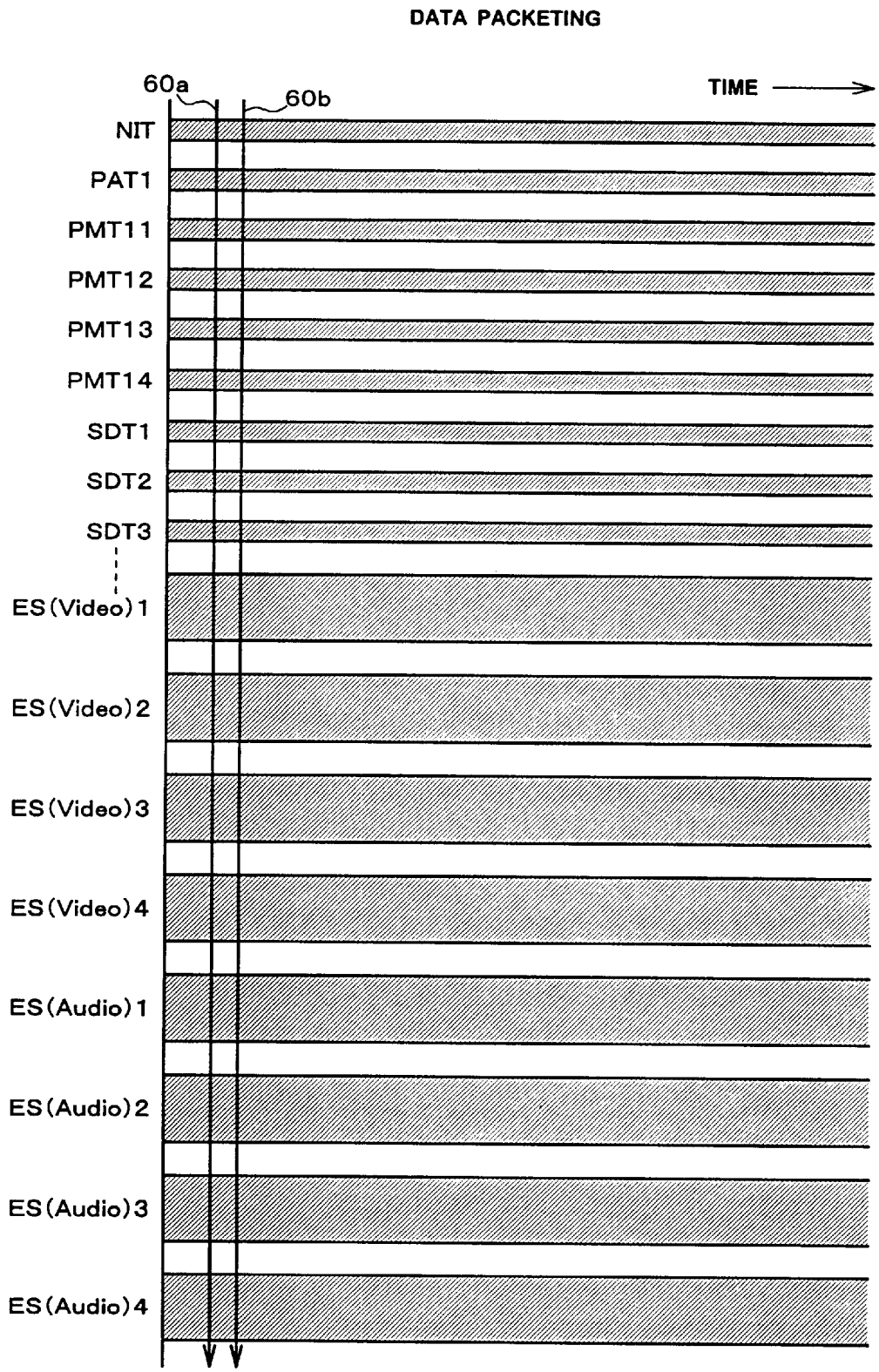
FIG. 24 shows the concept of arranging data in packets.
Figure 25:
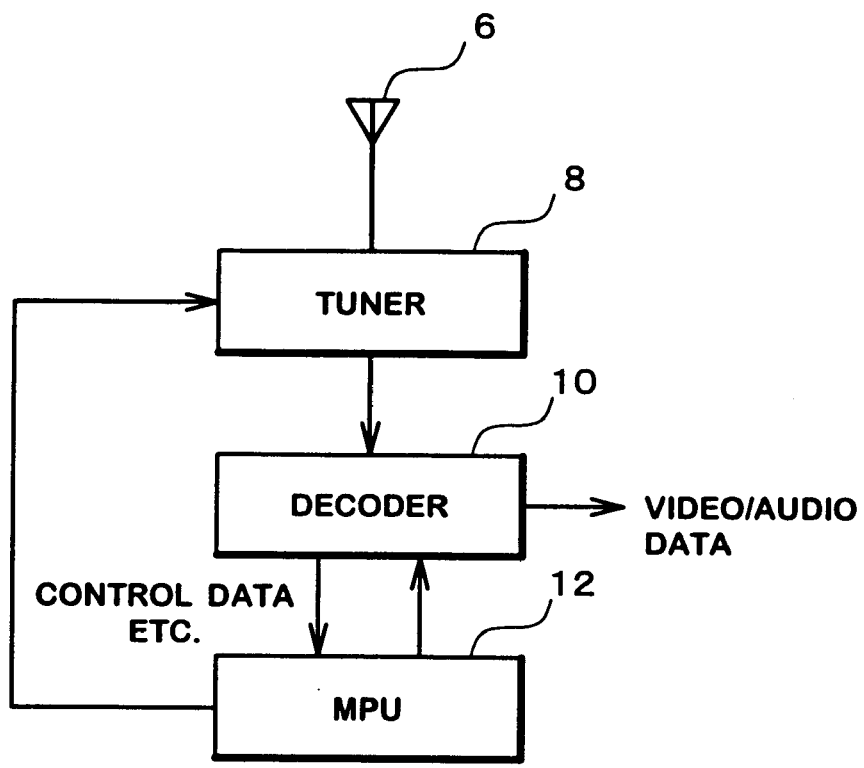
FIG. 25 roughly shows the constitution of the receiver.

FIG. 20 shows the data structure of the long term program information S_EIT generated with te SI generating circuit SG2. The bit numbers shown in the lower row 2003 are allocated to describe the data shown in the upper row 2002. In the "table id" 2004 is described an identifier for indicating that the control data is S_EIT. Since the S EIT is generated for each service, the ID of the service in which the long term program information is described by means of the S_EIT is described to the "service id" 2005. From the "event id" 2006 to the "descriptors( )" 2009, an area is repeatedly secured for each event (namely each program). Therefore, the "start time" 2007, "duration" 2008, and detail of contents of the program are described for each program identified with the event ID (event id). In the "descriptors( )" 2009, genres of the program (such as foreign films, Japanese films, and sports) are also described.

Incidentally, this embodiment is arranged to describe the long term program information for four days in one S_EIT. It is also arranged that the program information for up to one week to come is described in the S_EIT for one service. Therefore, a plural number of S_EIT are generated for one service, such as an S_EIT describing the program information for four days including today and another S_EIT for four days after that. These S_EITs are provided with different table IDs (table id) for discrimination from each other.

In FIG. 4, although only one S_EIT is shown for one service, actually a plural number of S_EITs having different table IDs (table ids) are multiplexed.

Incidentally, in the embodiment described above, the presence information is multiplexed in all the transport streams in which the service is included. However, it may also be arranged that the presence information is multiplexed not in all the transport streams but in one or more of them other than the specified transport stream. Furthermore, it may also be arranged that the presence information is multiplexed not only in all the transport streams that include the service but also in all the transport streams that do not include the service (such as the transport stream that includes the control data only).

Figure 8:
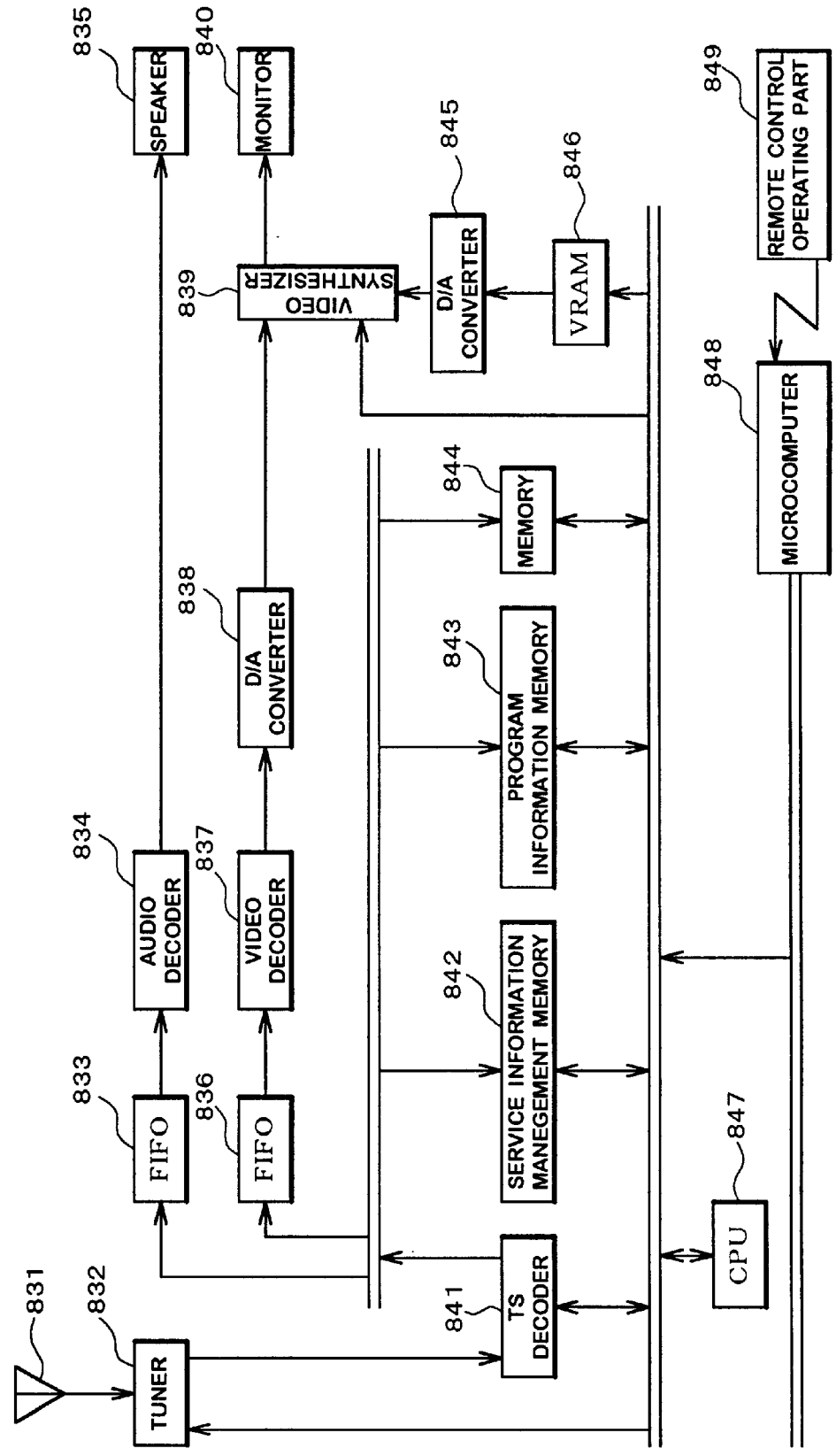
FIG. 8 shows a hardware structure of the receiver.

3. Details of Receiver:

FIG. 8 shows a hardware constitution of the receiver shown in FIG. 2, embodied by employing a CPU. An antenna 831 captures the radio wave from a transmitter and supplies it to a tuner 832. The tuner 832 under the instruction of a CPU 847 receives selectively one transport stream. The tuner 832 further performs demodulation and error correction processes, and outputs to a TS decoder 841.

The TS decoder 841 separates video and audio data of the required service from a plural number of services (video and audio data) multiplexed in the transport stream according to the packet identifier (PID) set with the CPU 847. The separated video data are given through a FIFO memory 836 to a video decoder 837, and expanded. The video data are converted into analog signals through a digital-to-analog (D/A) converter 838, passed through a video synthesizing circuit 839, and displayed on a monitor 840 such as a liquid crystal display and CRT. Incidentally, data written into a video RAM (VRAM) 846 are converted into analog signals through a digital-to-analog (D/A) converter 845 and given to a video synthesizing circuit 839. In this way, characters or the like may be displayed as superposed on a picture.

The separated audio data are given through a FIFO memory 833 to a audio decoder and expanded. The audio data are outputted as sound from a speaker 835.

In a service information management memory 842 are recorded a service overview table and presence information on the long term program for each service. In a program information memory 843 is recorded the acquired long term program information.

A remote control operating part 849 receives reception start by a receiving person, service specification, display command for the long term program information, and instruction for genre search for the program information, and output them to a microcomputer 848 of the main part of the receiver.

Figure 9:
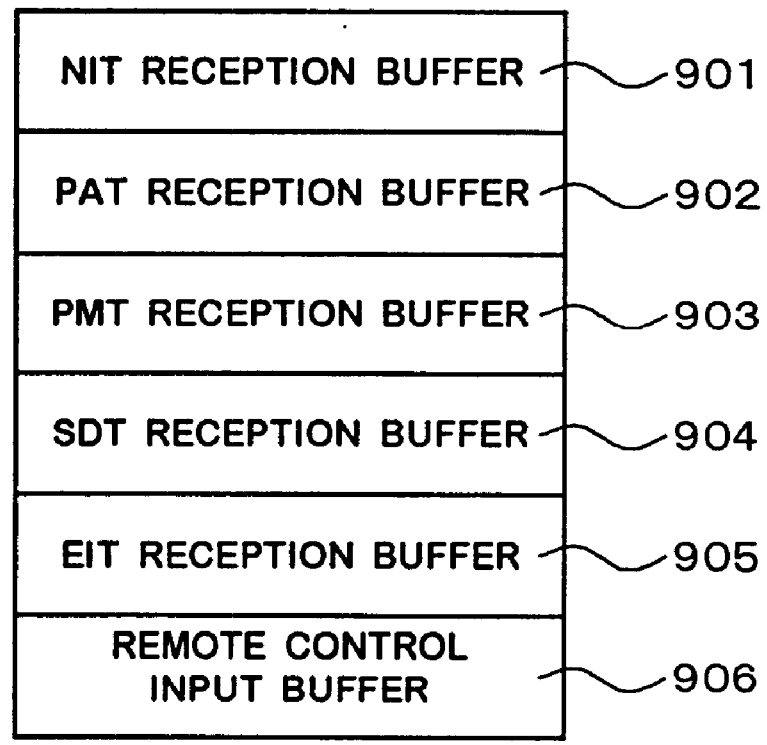
FIG. 9 shows a buffer provided for the memory 844.

The CPU 847 controls the tuner 832, and the TS decoder 842. The program for the control is recorded in the memory 844. Incidentally, this control program may be one that operates alone, or one that operates with an operating system as a premise. Furthermore, as shown in FIG. 9, the memory 844 is provided with areas serving as various buffers.

Figure 10:
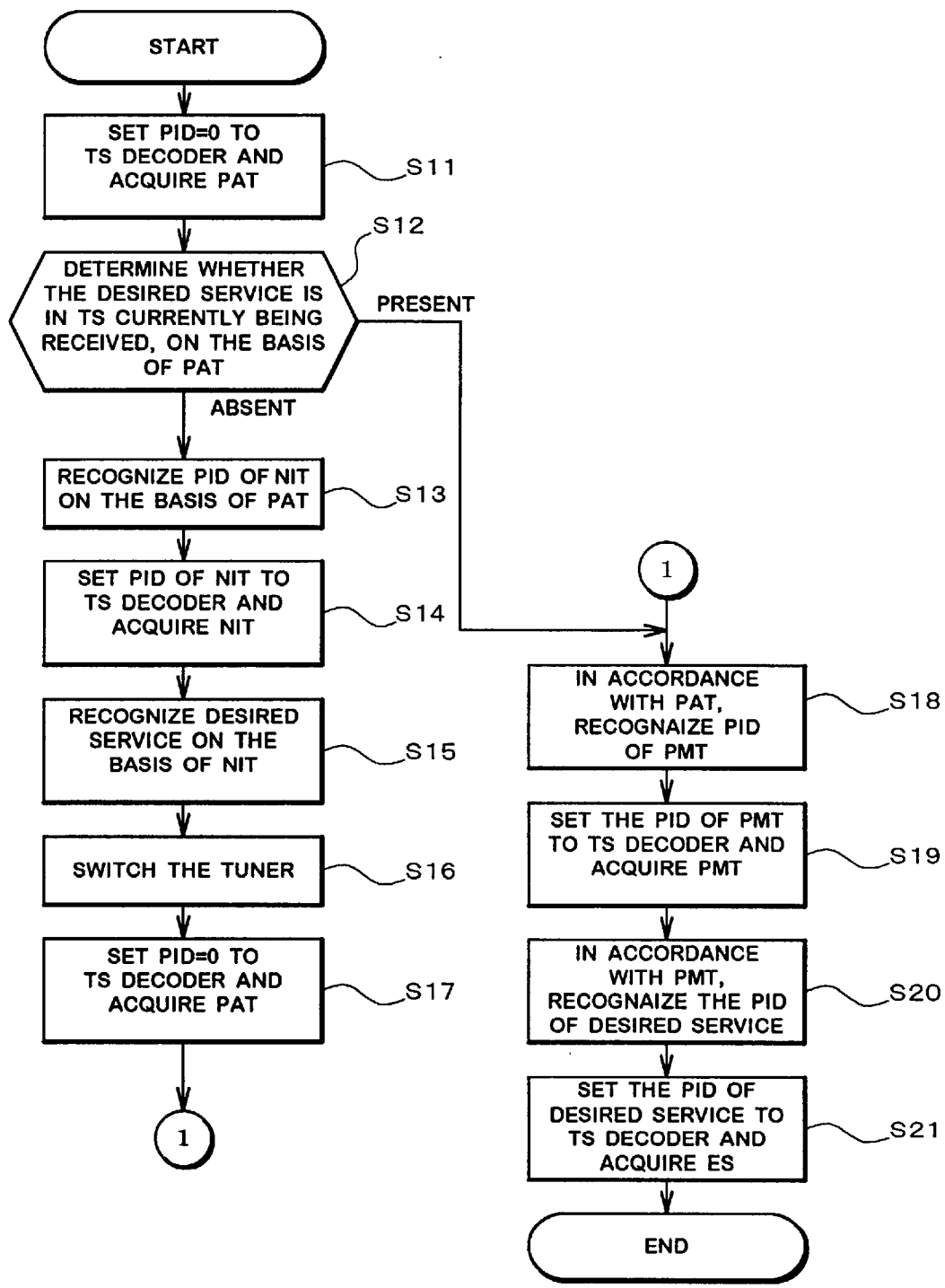
FIG. 10 shows a flow chart of basic process of reception.

FIG. 10 shows a flow chart of a basic reception process program recorded in the memory 844. The following explanation is made on the assumption that, when the service SV33 of the transport stream TS 3 is being received, a command to switch to the service SV12 of the transport stream TS1 is issued from the remote control operating part 849. Here, as shown in FIG. 4, it is assumed that the control data and video and audio data are multiplexed in all the transport streams TS1, TS2, and TS3.

The service switching command from the remote control operating part 849 is given to the microcomputer 848 and retained in a remote control input buffer 906 (Refer to FIG. 9) of the memory 844. This command is also given to a CPU 847.

First, the CPU 847 sets the PID of the control data PAT3 to the TS decoder 841, acquires the PAT3 of the transport stream currently being received, and retains it in a PAT reception buffer 902 of the memory 844 (step S11). Next, a determination is made whether a desired service SV12 is described in the acquired PAT3. In other words, it is determined whether the desired service SV12 is multiplexed in the transport stream TS3 currently being received (step S12). Since the service SV12 is not multiplexed in the transport stream TS3, the process goes on to the step S13.

In the step S13, the PID of the NIT is acquired according to the description of the acquired PAT3. Next, the CPU 847 sets the PID of the NIT to the TS decoder 841, takes in the control data NIT multiplexed in the transport stream TS3, and records in the NIT reception buffer 901 of the memory 844 (step S14). In the control data NIT are described service IDs multiplexed in respective transport streams. As the CPU 847 receives them, it is known that the service SV12 intended for reception is multiplexed in the transport stream TS1 (step S15).

Next, the CPU 847 controls the tuner 832 so that it receives the transport stream TS1 (step S16). It further sets the packet ID of the control data PAT1 (Refer to FIG. 4) to the TS decoder 841, takes in the control data PAT1, and records it in the PAT reception buffer of the memory 844 (step S17). To the control data PAT1 are also described the packet IDs of the control data PMT11, PMT12, PMT13, and PMT14.

From the control data PAT1 taken in, the CPU 847 acquires the packet ID of the control dataPMT12 of the service SV12 intended for reception (step S18). Next, the CPU 847 sets the packet ID to the TS decoder 841, and takes in the control data PMT12 (step S19). The CPU 847 further acquires from the control data PMT12 the packet IDs of the video data ES(A)12 and audio data ES(V)12 of the service SV12 intended for reception (step S20).

Next, the CPU 847 sets the packet IDC to the TS decode 841. As a result, the video data ES(A)12 and audio data ES(V)12 of the service SV12 are outputted from the TS decoder 841 and given to the FIFO memories 836 and 833. In the manner described above, the received service is switched.

Figure 11:
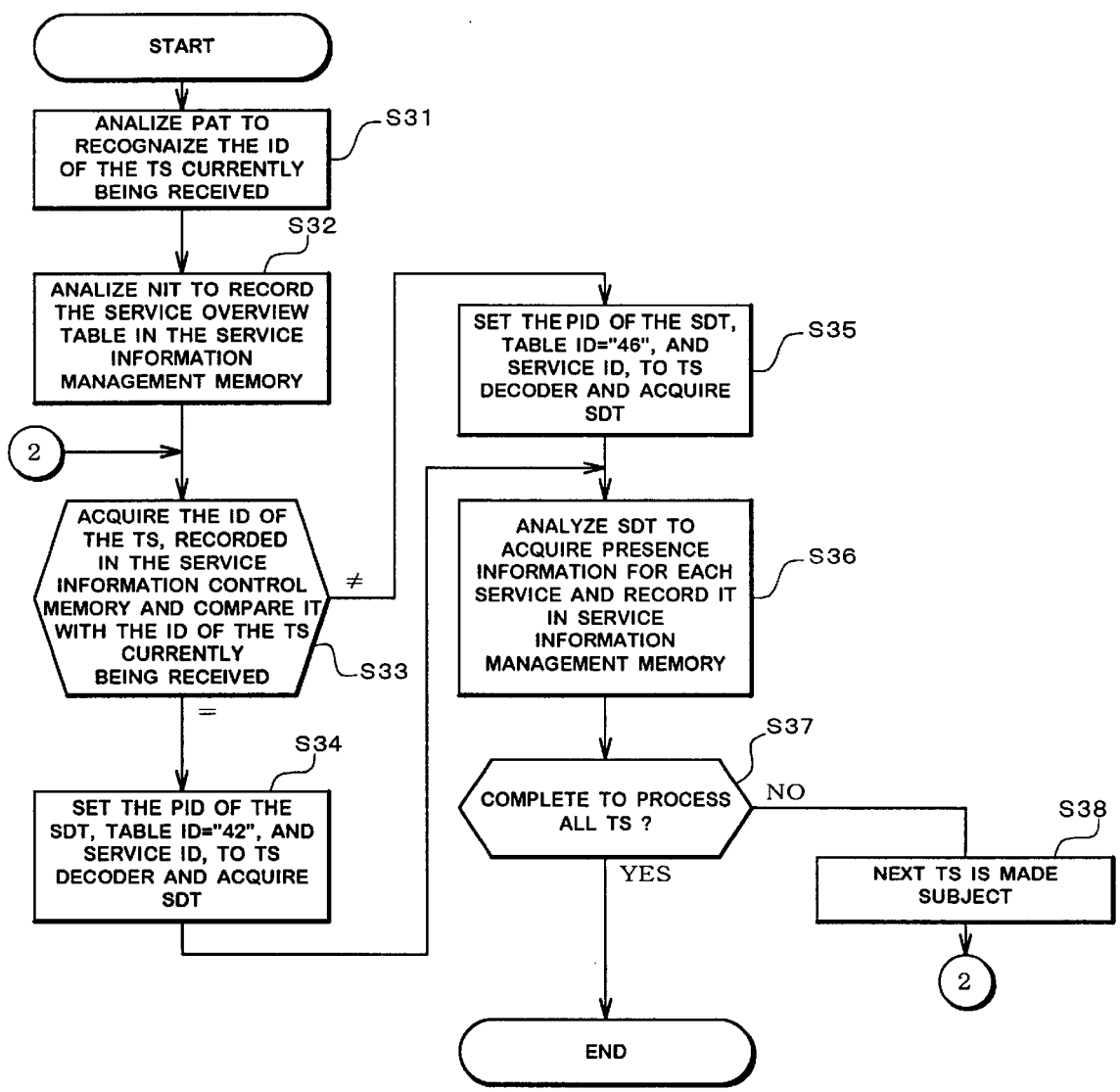
FIG. 11 shows a flow chart of the presence information recording process.

FIG. 11 shows a flow chart of the presence information recording process program recorded in the memory 844. This presence information recording process program is repeatedly executed every specified time (for example every two hours) by time interruption or the like while a basic receiving process is being executed.

Here, the explanation below is made on the assumption that the service SV12 of the transport stream TS1 is currently being received. First, the CPU 847 analyzes the control data PAT recorded in the PAT reception buffer 902 of the memory 844, and recognizes that the transport stream currently being received in TS1. In other words, the transport stream ID is recognized (step S31). Incidentally, since the presence information recording process is performed in the midst of the basic reception process, the control data Pat and NIT are recorded in the memory 844.

Next, the CPU 847 analyzes the control data NIT recorded in the NIT reception buffer 901 of the memory 844, and records, as a service information control table, the service overview table and the transport stream in which the service in question is multiplexed to the service information management memory 842. FIG. 12 shows the service information control table in which the IDs of the service and transport stream are recorded.

Next, the CPU 847 acquires the transport stream ID (0x0001, namely TS1 here) which appears first in the service information control table, and determines if the ID is the same as the transport stream ID currently being received (step S33). Since the service SV12 of the transport stream TS1 is currently being received and both of the IDs are the same, the process moves on to the step S34.

In the step S34, the ID of the SDT is set to the TS decoder 841. At the same time, table id="0x42," service ID (service id)="0x0001" are set to the TS decoder 841. In this way, it is possible to acquire the SDT1 of the transport stream TS1 and record it in the SDT reception buffer 904 of the memory 844. The CPU 847 then analyzes the "descriptors( )" area of the acquired control data SDT1 (Refer to FIG. 14) and acquires the presence information. In the "descriptors( )" area is described the presence information on the services SV11 through SV14 multiplexed in the transport stream TS1. This information is recorded in the presence information box in the service information control table for the service SV11 through SV14.

Next, a determination is made whether all the transport stream (namely all the services) are processed (step S37). If not, the next transport stream is made the subject and the step S33 and succeeding steps are repeatedly executed (step S38).

Here, if the transport stream ID (transport stream id) of the subject service is not equal to the transport stream ID (transport stream id) currently being received, the table ID (table id) is set as "0x46" in the step S35. In this way, the SDT may be acquired.

When the process is over for all the transport streams, the presence information recording process is complete. A service information control table obtained in this way is shown to FIG. 13.

While the above description is made for the case in which the recording process is made for each transport stream, it may be made for each service.

Furthermore, while this embodiment is arranged to make the presence information recording process at specified time intervals, the process may be made every time the specified control data are received. It may also be arranged that the process is made whenever room for processing is produced in the CPU.

Furthermore, it may also be arranged that the process is made before turning off the power supply when an instruction is given from the remote control operation part 849 to turn off the power supply.

Figure 17:
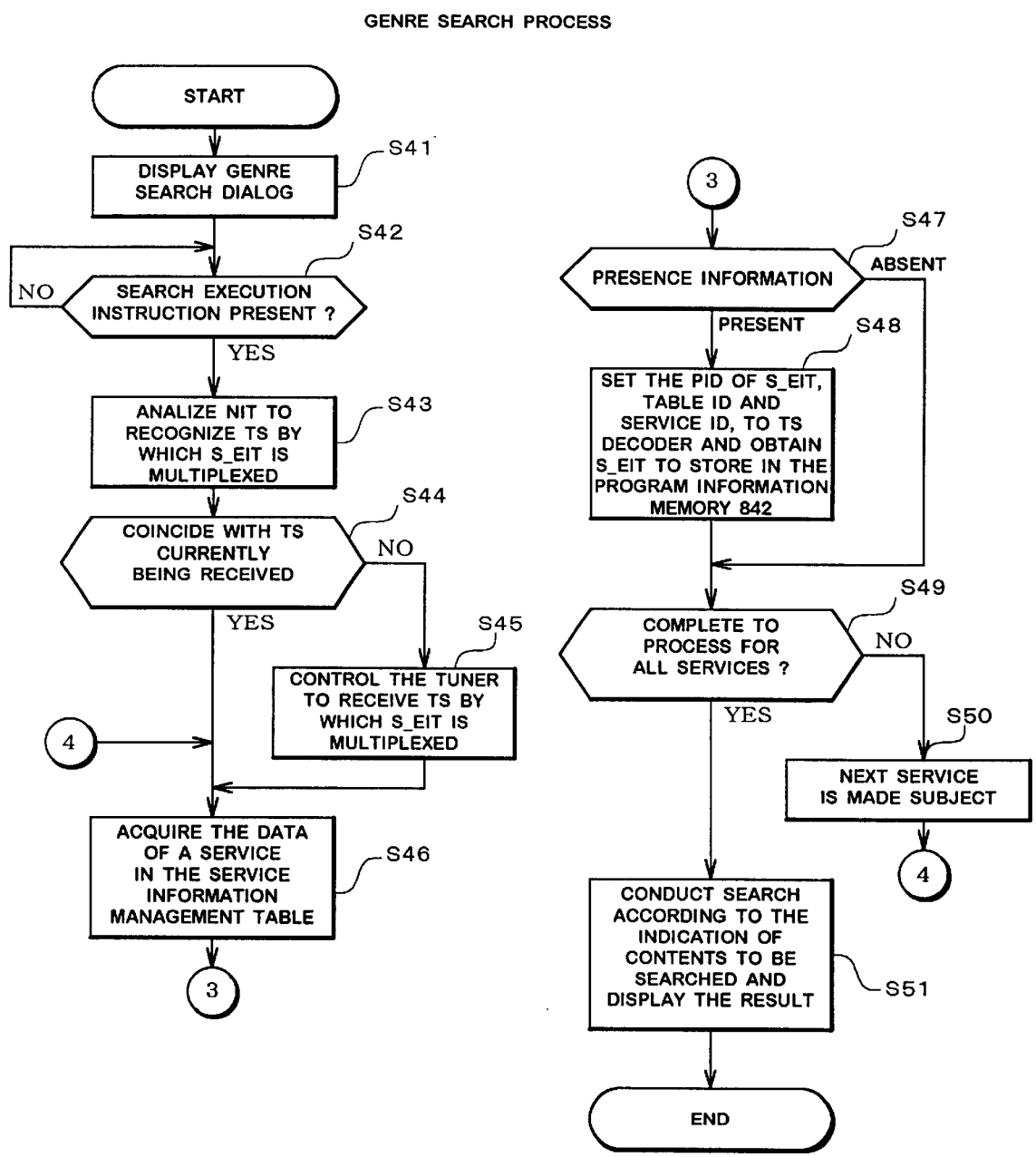
FIG. 17 shows a flow chart of a genre search process.

FIG. 17 shows a flow chart of a genre search process program recorded in the memory 844. Here, the term genre search refers to a process to select and display programs of a desired genre according to genre information included in the long term program information. In the following explanation, it is assumed that a genre search made while the service SV12 of the transport stream TS1 is currently received.

When a genre search command is issued from the remote control operation part 849, the microprocessor 848 transmits it to the CPU 847. The CPU 847 receives it and starts the genre search process of FIG. 17.

Figure 18:
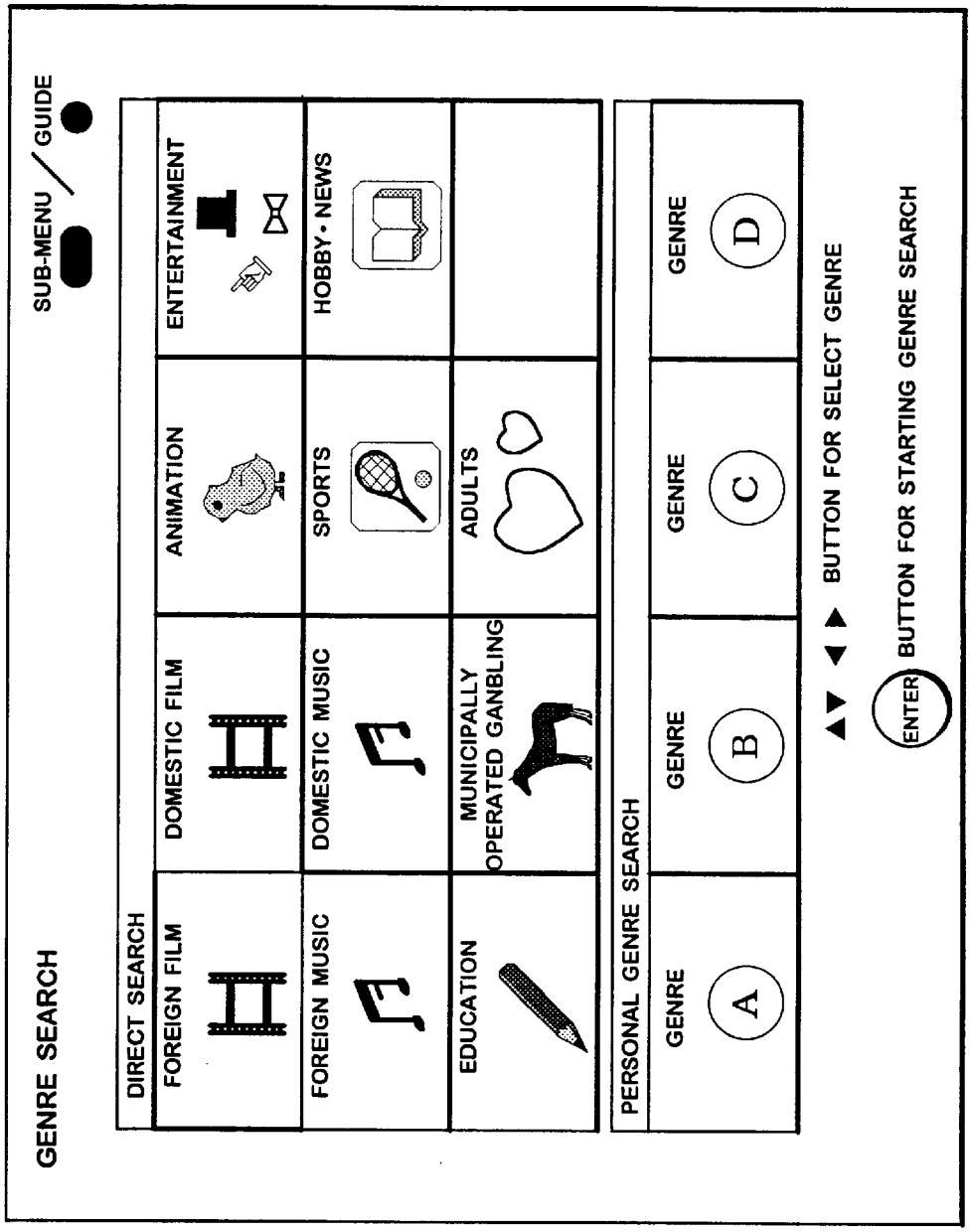
FIG. 18 shows a genre search screen.

First, the CPU 847 in the step S41 writes the data for the genre search menu to a VRAM 846. This causes a monitor 840 to display a genre search menu as shown in FIG. 18. The receiving person may select a genre to be searched by operating a cursor key (an arrow key) of the remote control operation part 849. FIG. 18 is incidentally in the state in which the genre of foreign films is selected. When a decision button of the remote control operation part 849 is pressed in that state, an instruction for executing a search for the programs belonging to the foreign film genre is given to the microcomputer 848. When the CPU 847 receives the search execution instruction from the microcomputer 848, the process goes to the step S43.

The CPU 847 analyzes the NIT stored in the NIT reception buffer 901 of the memory 844, the recognizes in which transport stream the long term program information S_EIT is multiplexed. Next, the CPU 847 determines whether the transport stream currently being received (TS1 here) coincides with the specified transport stream in which the long term program information S_EIT is multiplexed (step S44). Since it is not the case here, the tuner 832 is controlled to receive the specified transport stream TS2 (step S45).

Next, the contents of the presence information on the service of the first line in the service information control table (FIG. 13) are acquired (step S46). The first line describes the service SV11, and the state of the presence information is "yes." From this, it is learned that the long term program information S_EIT on the service SV11 is multiplexed.

With this embodiment, since the presence information is recorded in advance in the service information control table, the information may be quickly read from the memory 842 and used. In this way, the process is made quicker.

In the case of the state of the presence information is "yes," the process goes from the step S47 to the step S48, to the TS decoder 841 is set the PID of the S EIT. At the same time, the service ID (service id) and the table ID (table id) are also set to the TS decoder 841. In this way, the TS decoder 841 obtains only the S_EIT, from among S_EITs, in which the table id agrees with the service id.

As the service id, the service ID (service id) of the service SV11 currently made as the subject, namely "0×0011," is set. Also, it is arranged that long term program information for four days are described in one S_EIT11 and that the long term program information for one week may be acquired by sending out a plural number of the long term program information. Therefore, the long term program information for one week is acquired by setting the table ID (table id) of the plural number of S_EIT11.

The CPU 847 analyzes the description of the acquired S_EIT and writes the program information on the service in question to the program information table as shown in FIG. 21. In the program information table are written the service ID, event ID, date of broadcasting, broadcasting time, program name, genre and so on, and stored in the program information memory 843.

As described above, for the service in the case the state of the presence information to "yes," the S_EIT is acquired in the step S48 and its contents are recorded in the program information table. After that, the process goes to the step S49.

For the service in the case the state of the presence information is "no," the acquiring process of the step S48 is skipped to go to the step S49.

In the step S49, whether all the services are processed or not is determined. If any service remains to be processed in the service information control table, the next service is made the subject and the step S49 and the succeeding steps are repeatedly executed (step S50).

When the process for all the services is over by repeating the process described above, a program information table shown in FIG. 21 is recorded in the program information memory 843. Next, the CPU 847 performs a genre information search of the program information table according to the indication of the searched contents. Here, only the program in which the genre is about the foreign films is chosen. The CPU 847 writes the program information chosen as described above to the VRAM 846 to be displayed on the monitor 840.

Figure 19:
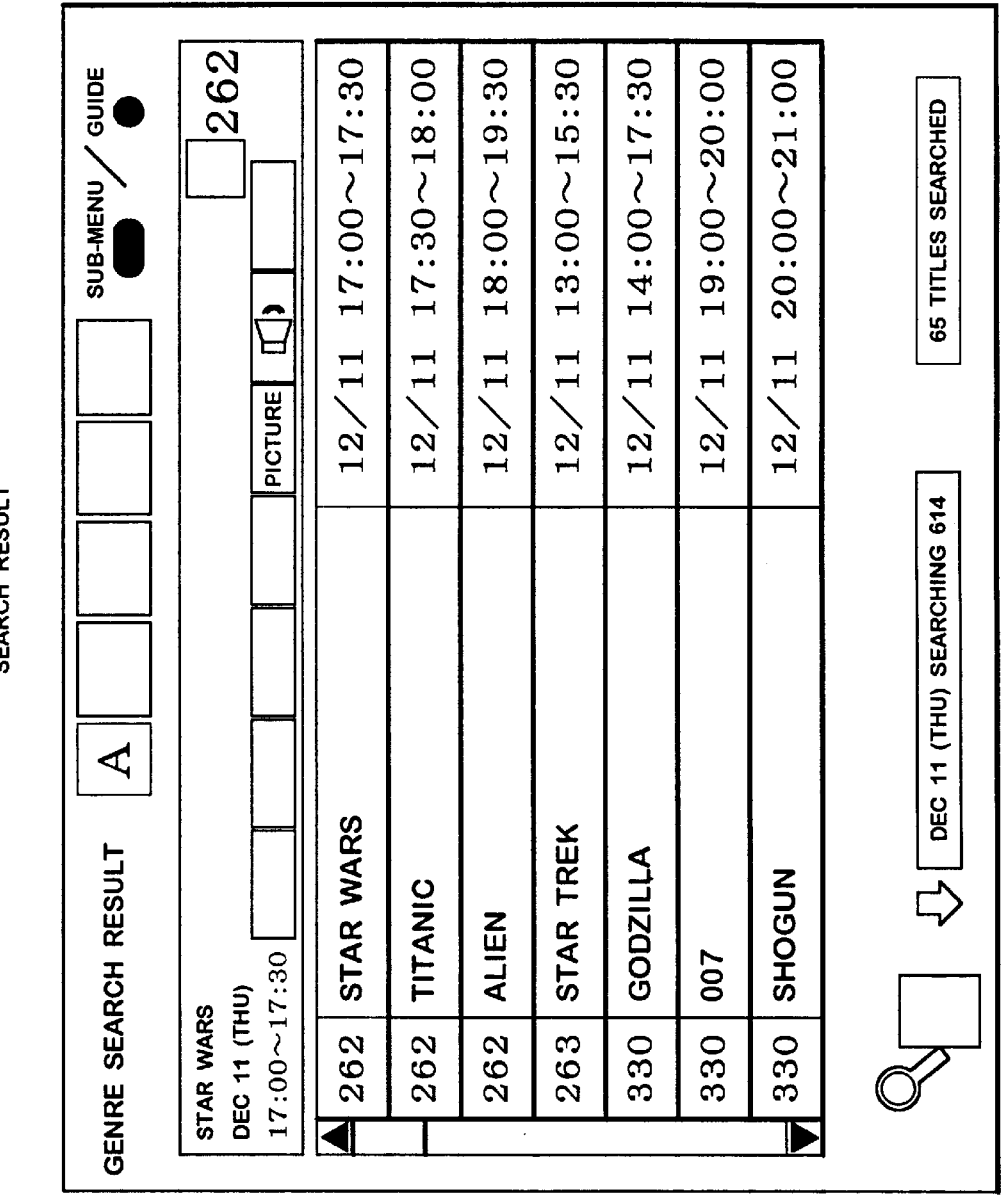
FIG. 19 shows a search result.

FIG. 19 shows the displayed search result. The receiving person may reserve reception of programs by operating the remote control operating port 849 to choose the programs on the displayed search result. That is to say, the CPU 847 refers to the calendar and clock of the receiver by retaining the service ID, event ID, broadcasting data, broadcasting start time, etc. of the chosen program in the memory 844, and automatically receives the intended program at the intended time.

Incidentally, while the process of search by the genre is explained above as an example in the case the presence information and the long term program information is required, the process may be generally applied to other cases of searches based on the described contents of the S_EIT such as by the broadcasting date, broadcasting time, and service.

In any case, the process that requires the presence information may be made quicker with this embodiment.

The embodiment described above is arranged to acquire the S_EIT by referring to the presence information and to record the program information table in the program information memory 843 every time the genre search command is issued from the remote control operating part 849. However, in the case the genre search command is issued from the remote control operating part 849 after the program information table is stored, the search may be made using the program information already recorded in the program information memory 843 to accelerate the display of the search results. In that case for example, the program information table may be renewed by performing the S_EIT acquisition process every time a command is given to turn off the power supply of the receiver. Alternatively, the program information table may be renewed by performing the S_EIT acquisition process at specified timings (for example regularly) while the transport stream is being received in which the S_EIT is multiplexed.

While the above embodiment is described as applied to the unidirectional wireless broadcasting, it may also be applied to the bi-directional broadcating. Furthermore, it may be applied not only to the wireless broadcasting but similarly to the wired broadcasting such as the cable television.

Furthermore, while the above embodiment is described as applied to broadcasting the video and audio data, it may be applied even to the cases of broadcasting computer programs and data as long as the concept of the program is involved.

While the above embodiment uses the CPU for embodying the function of each block of FIG. 2, part or whole of it may be constituted with a hardware logic.

What is claimed is:

1. A digital broadcasting system comprising (a) a transmitter for sending a plural number of transport streams, and (b) a receiver for selecting and receiving services in said transport streams, said transmitter comprising:
(a1) long term program information multiplexing means for making at least one transport stream a specified transport stream and for multiplexing long term program information for each service in said specified transport stream, and
(a2) presence information multiplexing means for multiplexing, in all said transport streams including at least one service, presence information for each service on whether said long term program information is multiplexed or not in said specified transport stream, and said receiver comprising:
(b1) presence information retaining means for acquiring and retaining said presence information for each service multiplexed in said transport stream currently being received, and
(b2) long term program information acquiring means for determining whether said long term program information for said service in question is present or not on the basis of said presence information retained in said presence information retaining means, said long term program information acquiring means acquiring said long term program information for only those in which said long term program information is present.

2. A digital broadcasting system of claim 1, wherein said presence information multiplexing means multiplexes said presence information also in all said transport streams that do not include services.

3. A digital broadcasting method wherein a plural number of transport streams are sent out, and on the receiving side, services in said transport streams are selected and received, and wherein on said sending side,
at least one transport stream is made a specified transport stream and long term program information on each service is multiplexed in said specified transport stream, and at the same time
for each service, presence information on whether said long term program information is multiplexed or not in said specified transport stream is multiplexed in all said transport streams including at least one service, and
on said receiving side
presence information on each service multiplexed in said transport stream currently being received is acquired and retained beforehand, and
whether said long term program information on the service in question is present or not is determined from said presence information retained beforehand in the case it is necessary to learn whether said long term program information is present or not for the service.

4. A digital broadcasting method of claim 3, wherein said presence information is further multiplexed in all said transport streams that do not include services.

5. A transmitter for sending a plural number of transport streams, comprising
long term program information multiplexing means for making at least one transport stream a specified transport stream, said long term program information multiplexing means multiplexing long term program information on each service in said specified transport stream, and
presence information multiplexing means for multiplexing, for each service, presence information on whether said long term program information is multiplexed or not in said specified transport stream in all said transport streams including at least one service.

6. A transmitter of claim 5, wherein said presence information is further multiplexed in all said transport streams that do not include services.

7. A digital communication method for sending a plural number of transport streams, wherein
at least one transport stream is made a specified transport stream and long term program information on each service is multiplexed in said specified transport stream, and
for each service, presence information on whether said long term program information is multiplexed or not in said specified transport stream is multiplexed also in transport streams other than said specified transport stream.

8. A digital communication method of claim 7, wherein said presence information is multiplexed in all said transport streams including at least one service.

9. A digital communication method of claim 8, wherein said presence information is multiplexed also in all said transport streams that do not include services.

10. A digital communication method of claim 7, wherein said presence information is described in a service description table (SDT).

11. A digital communication method of claim 10, wherein said presence information is described in a descriptor area of said service description table (SDT).

12. A digital communication method of claim 7, wherein said presence information is described in a network information table (NIT).

13. A digital communication method of claim 12 wherein said presence information is described in a description loop for each transport stream in said network information table (NIT).

14. A receiver for selecting and receiving services in a plural number of transport streams, comprising:
presence information retaining means for acquiring and retaining said presence information on each service multiplexed in said transport stream currently being received, and
long term program information acquiring means for determining whether said long term program information about the service in question is present or not in the case it is necessary to acquire said long term program information about a service, said long term program information acquiring means performing said long term program information acquiring process for only that in which said long term program information is present.

15. A receiver of claim 14, wherein said long term program information acquiring means acquires said long term program information without changing said transport stream to be received if said transport stream currently being received is a specified transport stream, and acquires said long term program information after changing said transport stream to be received into said specified transport stream if said transport stream currently being received is not a specified transport stream.

16. A receiver of claim 14, wherein said presence information retaining means acquires and retains said presence information for all said services at specified time intervals during said receiving operation.

17. A receiver of claim 14, wherein said presence information retaining means acquires and retains said presence information for all said services when a power supply is turned off.

18. A receiver of claim 14, further comprising:
long term program information memory means for storing said long term program information acquired with said long term program information acquiring means,
search receiving means for receiving search instruction for program information, and
search execution means which searches long term program information stored in said long term program information memory means according to said search instruction, and outputs search results,
wherein said long term program information starts its process by receiving said search instruction and stores said long term program information in said long term program information memory means, and
wherein said search execution means starts its process after said long term program information is stored in said long term program information memory means by said long term program information acquiring means.

19. A receiver for selectively receiving services in a plural number of transport streams, comprising:
a transport stream selecting part for selecting and receiving a transport stream according to an instruction from a processing part,
a separating part for separating and acquiring desired data from said transport stream selected with said transport stream selecting part according to said instruction from said processing part,
a processing part for controlling the operation of said transport stream selecting part and said separating part,
a program recording part for storing the program for determining the process contents of said processing part, and
a data recording part for recording data,
wherein said program causes a computer to execute the following processes:

while a desired transport stream is being received in said separating part, to acquire said presence information on said long term program information for each service multiplexed in said transport stream in question and record it in said data recording part, upon receiving an instruction to acquire said long term program information about a service, to determine whether said long term program information about the service is present or not from said presence information recorded in said data recording part, not to perform an acquiring process for those where no long term program information is present, and for those where said long term program information is present, to control said transport stream selecting part to receive said transport stream in which said long term program information is multiplexed, control said separating part to separate and acquire said long term program information from said transport stream in question.

20. A recording medium on which a program is recorded for controlling processes of selecting and receiving services in a plural number of transport streams, wherein said program controls, while a desired transport stream is being received in a separating part, to acquire presence information on a long term program information for each service multiplexed in said transport stream in question and record it in a data recording part, upon receiving an instruction to acquire said long term program information on services, to determine whether said long term program information is present or not for the service in question according to said presence information recorded in a data recording part, not to perform said acquisition process for those where no long term program information is present, and for those where said long term program information is present, to control a transport stream selecting part to receive said transport stream in which said long term program information is multiplexed, and control said separating part to separate and acquire said long term program information from said transport stream.

21. A digital communication method for selecting and receiving services in a plural number of transport streams, wherein presence information on each service multiplexed in said transport stream being received is acquired and retained, and in the case it is necessary to acquire long term program information on said service, determines whether said long term program information is present or not for the service in question according to said presence information retained in a presence information retaining means, and performs an acquisition process for only those where said long term program information is present.

* * * * *